US012761613B1

(12) United States Patent
Bodurka et al.

(10) Patent No.: US 12,761,613 B1
(45) Date of Patent: Oct. 13, 2026

(54) CONTROL SYSTEM FOR DOOR ASSEMBLY HAVING HIGH AND LOW VOLTAGE ELECTRICAL POWER SUPPLIES FOR INTEGRATED ELECTRIC DEVICES AND METHODS OF CONTROL

(71) Applicant: Masonite Corporation, Tampa, FL (US)

(72) Inventors: Alex Bodurka, Portage, MI (US); Steven B. Swartzmiller, Batavia, IL (US); Cory J. Sorice, La Grange, IL (US)

(73) Assignee: Masonite Corporation, Tampa, FL (US)

( * ) Notice: Subject to any disclaimer, the term of this patent is extended or adjusted under 35 U.S.C. 154(b) by 860 days.

(21) Appl. No.: 17/671,107

(22) Filed: Feb. 14, 2022

Related U.S. Application Data

(60) Provisional application No. 63/148,675, filed on Feb. 12, 2021.

(51) Int. Cl.
*G05B 15/02* (2006.01)
*E05B 47/00* (2006.01)

(52) U.S. Cl.
CPC .......... *G05B 15/02* (2013.01); *E05B 47/0001* (2013.01); *E05B 2047/0058* (2013.01); *E05B 2047/0068* (2013.01)

(58) Field of Classification Search
None
See application file for complete search history.

(56) References Cited

U.S. PATENT DOCUMENTS

| | | | |
|---|---|---|---|
| 612,192 | A | 10/1898 | Chandler |
| 615,209 | A | 11/1898 | Baxter |
| 1,744,040 | A | 1/1930 | Elzer |
| 3,355,695 | A | 11/1967 | Overesch |
| 3,838,234 | A | 9/1974 | Peterson |
| 3,842,386 | A | 10/1974 | Suska |
| 3,857,625 | A | 12/1974 | Crane et al. |
| 3,860,312 | A | 1/1975 | Gordon, Jr. |
| 5,024,614 | A | 6/1991 | Dola et al. |
| 5,212,907 | A | 5/1993 | Van Sandt |
| 5,511,915 | A | 4/1996 | Krahling |
| 6,350,135 | B1 | 2/2002 | Acklin et al. |

(Continued)

FOREIGN PATENT DOCUMENTS

| | | | |
|---|---|---|---|
| AU | 2020101466 | A4 | 8/2020 |
| CN | 200968110 | Y | 10/2007 |

(Continued)

*Primary Examiner* — Howard Cortes
(74) *Attorney, Agent, or Firm* — Ice Miller LLP

(57) ABSTRACT

Disclosed is a system and method directed to control of exterior doors for residential or commercial buildings, and more particularly to software control of a door provided with electrical power and electric and/or electronic devices mounted to the door, the door frame, or adjacent the door. The door is designed for control of electric devices integrated into or adjacent the door, with power run to and around the door, so electric devices may be easily integrated into and powered and operated from a central power controller without adversely impacting structural integrity, insulation and/or acoustic performance, energy efficiency, and aesthetics of the door.

14 Claims, 24 Drawing Sheets

(56) References Cited

U.S. PATENT DOCUMENTS

| | | | | |
|---|---|---|---|---|
| 7,125,136 | B1 | 10/2006 | Dedic et al. | |
| 7,824,200 | B2 | 11/2010 | Bryla et al. | |
| 7,999,690 | B1 | 8/2011 | Shilts | |
| 8,156,671 | B2 | 4/2012 | Presley et al. | |
| 8,169,169 | B2 | 5/2012 | Hass et al. | |
| 8,294,302 | B2 | 10/2012 | Peabody et al. | |
| 8,307,509 | B2 | 11/2012 | Schau | |
| 8,319,119 | B2 | 11/2012 | Wilker et al. | |
| 8,337,039 | B1 | 12/2012 | Larkin | |
| 8,354,914 | B2 | 1/2013 | Buckingham et al. | |
| 8,381,558 | B2 | 2/2013 | Alef | |
| 8,405,337 | B2 | 3/2013 | Gebhart et al. | |
| 8,772,970 | B2 | 7/2014 | Lambrou | |
| 9,290,966 | B2 | 3/2016 | Hanchett, Jr. | |
| 9,536,357 | B2 * | 1/2017 | Yulkowski | G07C 9/00571 |
| 9,652,917 | B2 | 5/2017 | Johnson et al. | |
| 9,704,320 | B2 | 7/2017 | Johnson et al. | |
| 9,922,513 | B1 | 3/2018 | Hall et al. | |
| 10,037,636 | B2 | 7/2018 | Ho et al. | |
| 10,043,332 | B2 | 8/2018 | Scalisi et al. | |
| 10,221,609 | B2 | 3/2019 | Yulkowski et al. | |
| 10,361,880 | B1 | 7/2019 | Marcinkowski et al. | |
| 10,453,280 | B2 | 10/2019 | Kontturi | |
| 10,664,688 | B2 | 5/2020 | Goulden et al. | |
| 10,691,953 | B2 | 6/2020 | Johnson et al. | |
| 10,733,823 | B2 | 8/2020 | Scalisi | |
| 10,755,509 | B2 | 8/2020 | Saeedi et al. | |
| 10,803,685 | B2 | 10/2020 | Marcinkowski et al. | |
| 10,818,118 | B2 | 10/2020 | Sivalingam et al. | |
| 10,938,250 | B2 | 3/2021 | Ahmed et al. | |
| 10,950,076 | B1 | 3/2021 | Hall et al. | |
| 10,964,138 | B2 | 3/2021 | Geerlings et al. | |
| 10,997,547 | B2 | 5/2021 | Hall et al. | |
| 10,999,092 | B2 | 5/2021 | Marcinkowski et al. | |
| 11,174,666 | B2 | 11/2021 | Demele et al. | |
| 11,244,523 | B1 | 2/2022 | Brady et al. | |
| 11,248,410 | B2 | 2/2022 | Dreyer et al. | |
| 11,290,298 | B2 | 3/2022 | Marcinkowski et al. | |
| 11,339,604 | B2 | 5/2022 | Dreyer | |
| 11,346,141 | B2 | 5/2022 | Gregoriou | |
| 11,346,150 | B1 * | 5/2022 | Johnston | A47G 29/141 |
| 11,352,812 | B2 | 6/2022 | Johnson | |
| 11,373,471 | B2 | 6/2022 | Anderson et al. | |
| D957,688 | S | 7/2022 | Kim et al. | |
| 11,388,373 | B2 | 7/2022 | Scalisi | |
| 11,393,108 | B1 * | 7/2022 | Modestine | G08B 13/19636 |
| 11,403,899 | B2 | 8/2022 | Zhang | |
| 11,403,902 | B2 | 8/2022 | Ho et al. | |
| 11,417,200 | B2 | 8/2022 | Hass et al. | |
| 11,441,332 | B2 | 9/2022 | Johnson et al. | |
| 11,532,192 | B2 * | 12/2022 | Hass | G06F 21/35 |
| 11,536,078 | B2 * | 12/2022 | Dreyer | E05F 15/76 |
| 11,539,794 | B1 | 12/2022 | Weber et al. | |
| 11,543,801 | B2 | 1/2023 | Hall et al. | |
| 11,627,289 | B1 * | 4/2023 | Siminoff | H04N 7/183 348/155 |
| 11,655,669 | B2 | 5/2023 | Hutton et al. | |
| 11,694,287 | B2 | 7/2023 | Marcinkowski et al. | |
| 11,729,014 | B2 | 8/2023 | Marcinkowski et al. | |
| 11,767,710 | B1 | 9/2023 | Johnston | |
| 2003/0167693 | A1 | 9/2003 | Mainini | |
| 2008/0222432 | A1 * | 9/2008 | Gilbert | H01R 31/065 713/300 |
| 2012/0073083 | A1 | 3/2012 | Staude | |
| 2014/0001880 | A1 | 1/2014 | Herglotz et al. | |
| 2014/0020295 | A1 | 1/2014 | Bonahoom et al. | |
| 2014/0213073 | A1 | 7/2014 | Harvey | |
| 2014/0267739 | A1 | 9/2014 | Ibsies | |
| 2015/0137963 | A1 * | 5/2015 | Yulkowski | E05F 15/00 49/70 |
| 2016/0163139 | A1 | 6/2016 | Kankkunen et al. | |
| 2016/0239001 | A1 | 8/2016 | Chin et al. | |
| 2016/0322847 | A1 | 11/2016 | Geiszler | |
| 2016/0328901 | A1 | 11/2016 | Johnson | |
| 2016/0333606 | A1 | 11/2016 | Mahoney | |
| 2016/0380475 | A1 * | 12/2016 | Yang | H02J 9/066 307/66 |
| 2017/0040827 | A1 | 2/2017 | Weber | |
| 2017/0238401 | A1 * | 8/2017 | Sadwick | A61N 5/01 315/294 |
| 2017/0306674 | A1 | 10/2017 | Soloski et al. | |
| 2017/0358952 | A1 | 12/2017 | Butler et al. | |
| 2018/0261060 | A1 * | 9/2018 | Siminoff | G08B 25/08 |
| 2019/0271186 | A1 | 9/2019 | Chen et al. | |
| 2019/0333302 | A1 | 10/2019 | Kagnew et al. | |
| 2019/0338583 | A1 * | 11/2019 | Jude | E06B 7/34 |
| 2020/0014552 | A1 | 1/2020 | Tan et al. | |
| 2020/0040649 | A1 * | 2/2020 | Harvey | E06B 7/28 |
| 2020/0043271 | A1 * | 2/2020 | Anderson | G07C 9/00571 |
| 2020/0082240 | A1 | 3/2020 | Heitmar | |
| 2020/0349786 | A1 | 11/2020 | Ho et al. | |
| 2020/0378172 | A1 | 12/2020 | Lerpard | |
| 2021/0035394 | A1 * | 2/2021 | Anderson | E05D 11/0081 |
| 2021/0207419 | A1 | 7/2021 | Sorice et al. | |
| 2021/0207420 | A1 | 7/2021 | Sorice et al. | |
| 2021/0207421 | A1 | 7/2021 | Sorice et al. | |
| 2021/0209878 | A1 | 7/2021 | Kim et al. | |
| 2022/0155005 | A1 | 5/2022 | Lee et al. | |
| 2022/0186543 | A1 | 6/2022 | Soderqvist | |
| 2022/0263297 | A1 | 8/2022 | Bodurka et al. | |
| 2022/0351722 | A1 | 11/2022 | Mandry et al. | |
| 2022/0392287 | A1 * | 12/2022 | Shen | G06Q 50/163 |
| 2023/0062621 | A1 | 3/2023 | Cheung | |
| 2023/0184022 | A1 | 6/2023 | Eliasson et al. | |

FOREIGN PATENT DOCUMENTS

| | | | |
|---|---|---|---|
| CN | 103606213 | A | 2/2014 |
| CN | 104105248 | A | 10/2014 |
| CN | 203925102 | U | 11/2014 |
| CN | 205117039 | U | 3/2016 |
| CN | 106761274 | A | 5/2017 |
| CN | 106836990 | A | 6/2017 |
| CN | 206309153 | U | 7/2017 |
| CN | 206329255 | U | 7/2017 |
| CN | 107191110 | A | 9/2017 |
| CN | 107448128 | A | 12/2017 |
| CN | 107575137 | A | 1/2018 |
| CN | 107610390 | A | 1/2018 |
| CN | 107643706 | A | 1/2018 |
| CN | 206903524 | U | 1/2018 |
| CN | 107705511 | A | 2/2018 |
| CN | 107730687 | A | 2/2018 |
| CN | 107747457 | A | 3/2018 |
| CN | 107795255 | A | 3/2018 |
| CN | 107829659 | A | 3/2018 |
| CN | 108118987 | A | 6/2018 |
| CN | 207458156 | U | 6/2018 |
| CN | 108389290 | A | 8/2018 |
| CN | 108399674 | A | 8/2018 |
| CN | 108412359 | A | 8/2018 |
| CN | 108442852 | A | 8/2018 |
| CN | 108661486 | A | 10/2018 |
| CN | 108756617 | A | 11/2018 |
| CN | 108868508 | A | 11/2018 |
| CN | 108915498 | A | 11/2018 |
| CN | 108924015 | A | 11/2018 |
| CN | 108952449 | A | 12/2018 |
| CN | 109098543 | A | 12/2018 |
| CN | 109138774 | A | 1/2019 |
| CN | 109191617 | A | 1/2019 |
| CN | 109191739 | A | 1/2019 |
| CN | 109236134 | A | 1/2019 |
| CN | 109236135 | A | 1/2019 |
| CN | 109267837 | A | 1/2019 |
| CN | 109472902 | A | 3/2019 |
| CN | 208777869 | U | 4/2019 |
| CN | 110009782 | A | 7/2019 |
| CN | 110264682 | A | 9/2019 |
| CN | 209429913 | U | 9/2019 |
| CN | 110409954 | A | 11/2019 |
| CN | 110505182 | A | 11/2019 |
| CN | 110531631 | A | 12/2019 |
| CN | 209990389 | U | 1/2020 |

(56) References Cited

FOREIGN PATENT DOCUMENTS

| | | | |
|---|---|---|---|
| CN | 110778265 | A | 2/2020 |
| CN | 111173404 | A | 5/2020 |
| CN | 111270959 | A | 6/2020 |
| CN | 111343432 | A | 6/2020 |
| CN | 111441680 | A | 7/2020 |
| CN | 211038390 | U | 7/2020 |
| CN | 211124167 | U | 7/2020 |
| CN | 111505947 | A | 8/2020 |
| CN | 111540093 | A | 8/2020 |
| CN | 111653025 | A | 9/2020 |
| CN | 111764747 | A | 10/2020 |
| CN | 211851423 | U | 11/2020 |
| CN | 112096221 | A | 12/2020 |
| CN | 112211496 | A | 1/2021 |
| CN | 112267796 | A | 1/2021 |
| CN | 112330869 | A | 2/2021 |
| CN | 112491668 | A | 3/2021 |
| CN | 112539020 | A | 3/2021 |
| CN | 213205374 | U | 5/2021 |
| CN | 112901047 | A | 6/2021 |
| CN | 113048374 | A | 6/2021 |
| CN | 113129476 | A | 7/2021 |
| CN | 113338772 | A | 9/2021 |
| CN | 113345130 | A | 9/2021 |
| CN | 113545639 | A | 10/2021 |
| CN | 113645446 | A | 11/2021 |
| CN | 113674454 | A | 11/2021 |
| CN | 113706744 | A | 11/2021 |
| CN | 214835862 | U | 11/2021 |
| CN | 214886488 | U | 11/2021 |
| CN | 214943492 | U | 11/2021 |
| CN | 215169563 | U | 12/2021 |
| CN | 113947834 | A | 1/2022 |
| CN | 217240775 | U | 8/2022 |
| CN | 217307315 | U | 8/2022 |
| CN | 115095246 | A | 9/2022 |
| CN | 115164381 | A | 10/2022 |
| CN | 115235096 | A | 10/2022 |
| CN | 115294675 | A | 11/2022 |
| CN | 115324428 | A | 11/2022 |
| CN | 115341821 | A | 11/2022 |
| CN | 115393988 | A | 11/2022 |
| CN | 218454661 | U | 2/2023 |
| CN | 115798084 | A | 3/2023 |
| CN | 116251221 | A | 6/2023 |
| CN | 219197192 | U | 6/2023 |
| CN | 219246122 | U | 6/2023 |
| CN | 116498183 | A | 7/2023 |
| CN | 116760602 | A | 9/2023 |
| CN | 117238059 | A | 12/2023 |
| DE | 202022101334 | U1 | 5/2022 |
| EP | 3118405 | A1 | 1/2017 |
| EP | 3537398 | A1 | 9/2019 |
| EP | 3845729 | A1 | 7/2021 |
| FR | 3132160 | A3 | 7/2023 |
| IN | 201921017138 | A | 5/2019 |
| IN | 201911049967 | A | 12/2019 |
| IN | 201911048995 | A | 5/2021 |
| IN | 202111053824 | A | 12/2021 |
| IN | 202241020116 | A | 4/2022 |

| | | | |
|---|---|---|---|
| IN | 202241026843 | A | 5/2022 |
| IN | 411059 | B | 11/2022 |
| IN | 202111013824 | A | 12/2022 |
| IN | 430120 | B | 4/2023 |
| IN | 202341019331 | A | 4/2023 |
| JP | 6680821 | B2 | 3/2020 |
| JP | 2020042440 | A | 3/2020 |
| JP | 6777955 | B2 | 10/2020 |
| KR | 20160025226 | A | 3/2016 |
| KR | 20160050965 | A | 5/2016 |
| KR | 20160123639 | A | 10/2016 |
| KR | 20160124481 | A | 10/2016 |
| KR | 101800514 | B1 | 12/2017 |
| KR | 20180076537 | A | 7/2018 |
| KR | 20180131716 | A | 12/2018 |
| KR | 101988851 | B1 | 6/2019 |
| KR | 20190098719 | A | 8/2019 |
| KR | 20190098720 | A | 8/2019 |
| KR | 102024754 | B1 | 9/2019 |
| KR | 102079532 | B1 | 2/2020 |
| KR | 102150642 | B1 | 9/2020 |
| KR | 20200143302 | A | 12/2020 |
| KR | 20210004253 | A | 1/2021 |
| KR | 20210016726 | A | 2/2021 |
| KR | 20210019211 | A | 2/2021 |
| KR | 20210019216 | A | 2/2021 |
| KR | 20210019218 | A | 2/2021 |
| KR | 20210019241 | A | 2/2021 |
| KR | 20210045195 | A | 4/2021 |
| KR | 20210072510 | A | 6/2021 |
| KR | 20210078199 | A | 6/2021 |
| KR | 102303254 | B1 | 9/2021 |
| KR | 102329035 | B1 | 11/2021 |
| KR | 102341883 | B1 | 12/2021 |
| KR | 20210153308 | A | 12/2021 |
| KR | 20220031428 | A | 3/2022 |
| KR | 102421708 | B1 | 7/2022 |
| KR | 20220113136 | A | 8/2022 |
| KR | 20220119878 | A | 8/2022 |
| KR | 102472384 | B1 | 12/2022 |
| KR | 102534826 | B1 | 5/2023 |
| TW | M627626 | U | 6/2022 |
| WO | 2013163124 | A1 | 10/2013 |
| WO | 2016032464 | A1 | 3/2016 |
| WO | 2016175910 | A1 | 11/2016 |
| WO | 2017024088 | A1 | 2/2017 |
| WO | 2018184450 | A1 | 10/2018 |
| WO | 2018184452 | A1 | 10/2018 |
| WO | 2018184453 | A1 | 10/2018 |
| WO | 2018184454 | A1 | 10/2018 |
| WO | 2019068021 | A1 | 4/2019 |
| WO | 2019162435 | A1 | 8/2019 |
| WO | 2020028881 | A1 | 2/2020 |
| WO | 2022004989 | A1 | 1/2022 |
| WO | 2022010071 | A1 | 1/2022 |
| WO | 2022010072 | A1 | 1/2022 |
| WO | 2022010073 | A1 | 1/2022 |
| WO | 2022010074 | A1 | 1/2022 |
| WO | 2022020893 | A1 | 2/2022 |
| WO | 2022145966 | A1 | 7/2022 |
| WO | 2022263147 | A1 | 12/2022 |
| WO | 2023180427 | A1 | 9/2023 |

* cited by examiner

CONTROL SYSTEM FOR DOOR ASSEMBLY HAVING HIGH AND LOW VOLTAGE ELECTRICAL POWER SUPPLIES FOR INTEGRATED ELECTRIC DEVICES AND METHODS OF CONTROL

CROSS-REFERENCE TO RELATED APPLICATIONS AND CLAIM TO PRIORITY

This application claims the priority of U.S. Provisional Patent Application No. 63/148,675, filed Feb. 12, 2021, which is incorporated herein by reference.

FIELD OF THE INVENTION

The present invention is directed to a control system for exterior doors for residential or commercial buildings, and more particularly to a system utilizing software control of a door provided with electrical power and electric and/or electronic devices mounted to the door, the door frame, or adjacent the door.

BACKGROUND OF THE INVENTION

Typical existing exterior or interior doors for residential or commercial buildings may have a number of electric devices (or components) mounted to the doors or near the doors in order to provide desired functions, such as electronic access control, door state feedback, an entry camera and audio communication, an electric powered door latch, an electric powered door lock, etc. Also, the market for exterior and interior doors has seen an increasing adoption of additional electric and electronic devices, including video doorbells, smart locks, LED lighting, smart glass, electromechanical door closers, wireless connectivity electronics, etc. Each of these discrete electric devices is an add-on to an existing door, functions with the existing door construction, and is powered separately with at least one battery that requires periodic replacement. Should the battery not be replaced, then the electric device will not operate. The various electric devices each may have a software-based controller that also provides information to the user.

Current electric devices are mounted to or adjacent exterior or interior doors in a manner that can be unattractive and unpleasant to look at. The electric devices typically each have either one or more rechargeable battery packs or at least one non-rechargeable battery that must periodically be recharged or changed and have some type of weatherable housing. The electric devices are usually aftermarket components that do not match or are not designed to function with the particular door. In addition, inasmuch as these devices are only attached to the door outer surfaces, they can be removed by theft or force.

Further, existing door systems that incorporate electric or electronic controls typically have a controller, hardware or software, for each device, complicating control as the owner must then individually use the controller unique to the device.

Therefore, the need exists for a door designed for control of electric devices integrated into or adjacent the door, with power run to and around the door assembly so electric devices may be easily integrated into and powered and operated from a central controller without adversely impacting structural integrity, insulation and/or acoustic performance, energy efficiency, and aesthetics of the door.

SUMMARY OF THE INVENTION

An aspect of the present invention provides a control system for controlling exterior doors of residential or commercial buildings. The system includes hardware and software platforms for controlling a door provided with electrical power and electric devices mounted to the door, the door frame, or adjacent the door. The control system also allows for monitoring and diagnostics of the electric devices and other components within the system.

Another aspect of the invention provides a door having a control system for controlling electric devices mounted to the door, the door frame, or adjacent the door. The door is designed for control of electric devices integrated into or adjacent the door, with power run to and around the door, so electric devices may be easily integrated into and powered and operated from a central power controller without adversely impacting structural integrity, insulation and/or acoustic performance, energy efficiency, and aesthetics of the door.

Methods for making and using the different aspects of the present invention are also provided.

Other aspects of the invention, including apparatus, devices, kits, processes, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In the drawings.

DETAILED DESCRIPTION OF EXEMPLARY EMBODIMENTS

Figure 1:
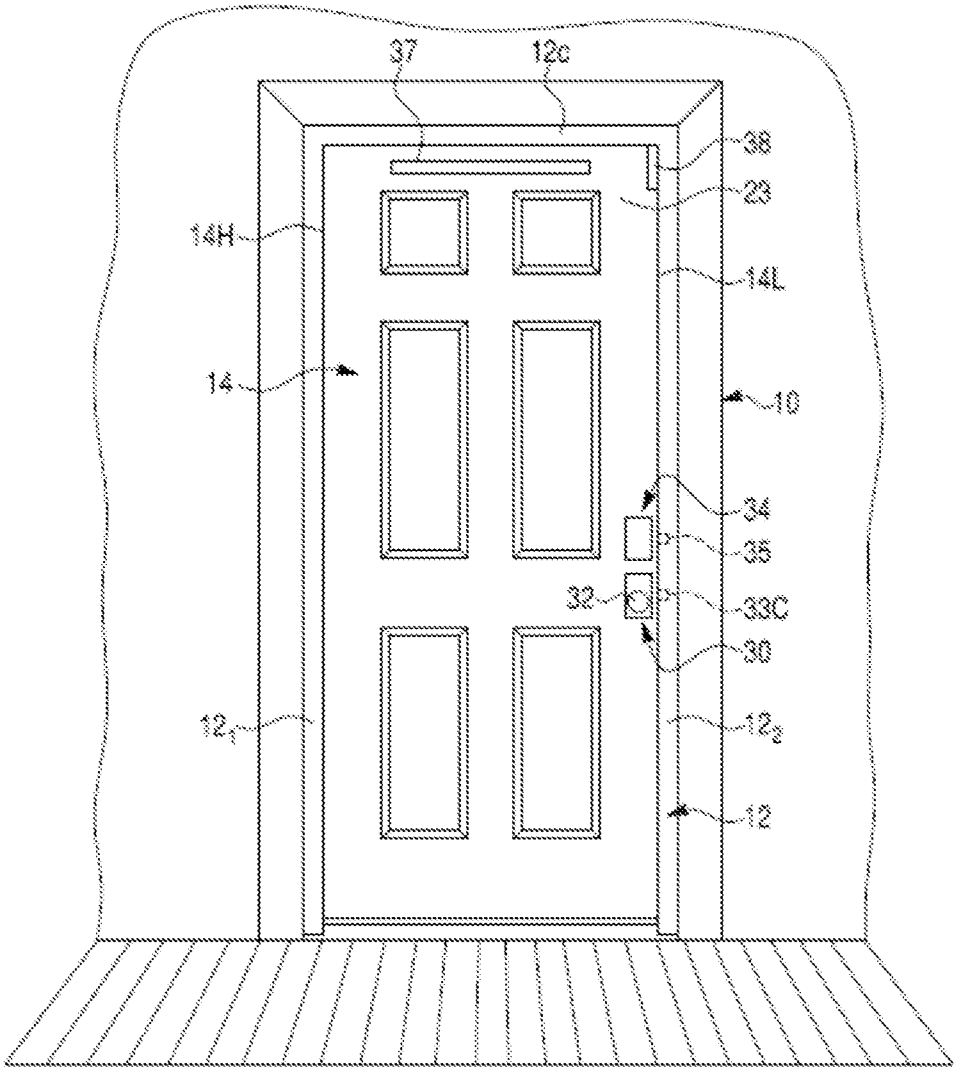
FIG. 1 is an elevational exterior view of an exterior door assembly according to a first exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 2:
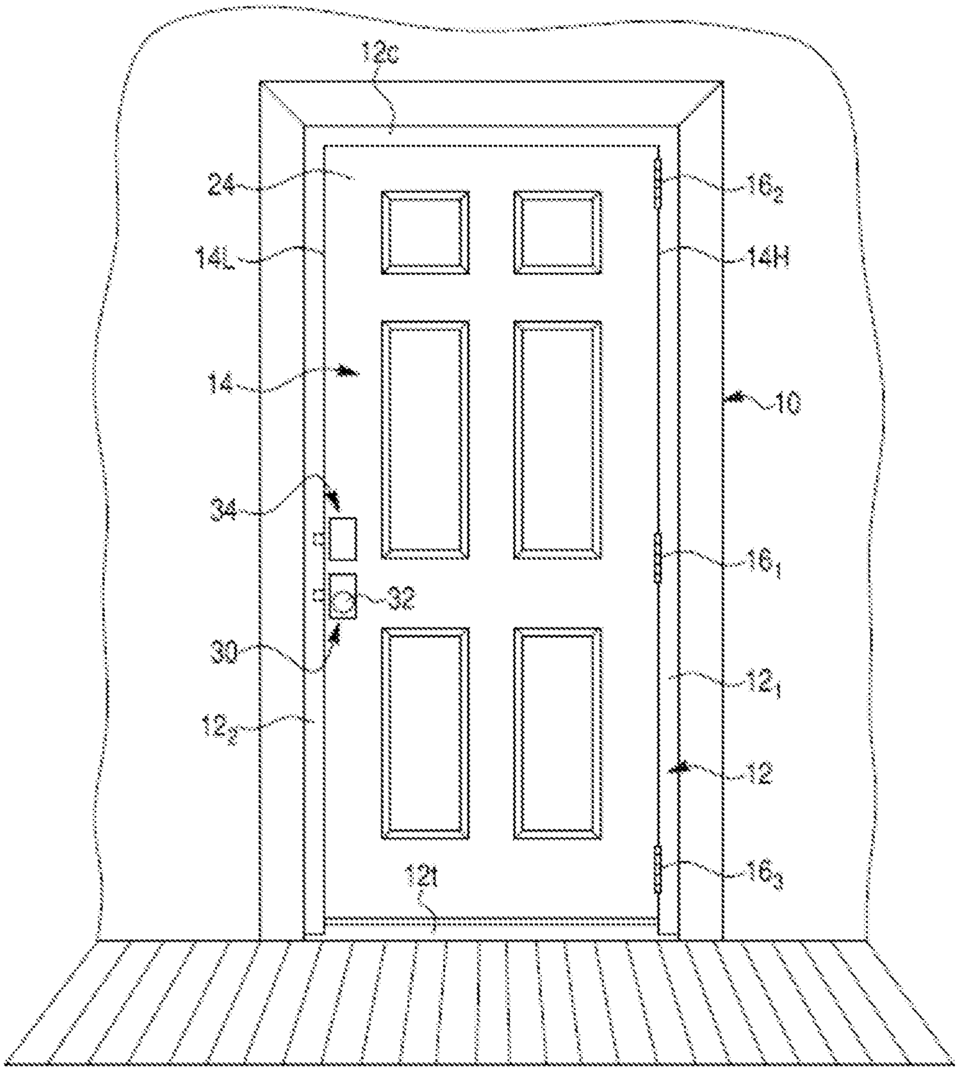
FIG. 2 is an elevational interior view of the door assembly according to the first exemplary embodiment of the present invention.

FIGS. 1 and 2 depict a door assembly 10 according to a first exemplary embodiment of the present invention, such as a pre-hung exterior door. The door assembly 10 is a conventional hinged residential exterior door assembly, but it should be understood that the door assembly 10 may be an exterior or interior door assembly provided for a residential or commercial building, such as a home, apartment, garage, condominium, hotel, office building, or the like. The door assembly 10 may be made of any appropriate material, such as wood, metal, wood composite material, fiberglass reinforced polymer composite or the like. The door assembly 10 includes a substantially rectangular frame assembly 12 and a door 14 pivotally attached thereto by at least one hinge $\mathbf{16}_1$, such as "butt hinge" that includes two leaves.

The frame assembly 12 includes first and second parallel, spaced apart vertically extending jamb members $\mathbf{12}_1$, $\mathbf{12}_2$ and a horizontally extending upper jamb rail member or header 12*c* that connects upper ends of the first and second jamb members $\mathbf{12}_1$, $\mathbf{12}_2$. Those skilled in the art recognize that lower ends of the jamb members $\mathbf{12}_1$, $\mathbf{12}_2$ may be interconnected through a threshold $\mathbf{12}_t$.

The at least one hinge $\mathbf{16}_1$ pivotally attaches the door 14 to the first jamb member $\mathbf{12}_1$. Typically, at least two hinges $\mathbf{16}_1$ and $\mathbf{16}_2$ are provided to secure the door 14 to the first jamb member $\mathbf{12}_1$. Preferably, as best shown in FIG. 2, three hinges $\mathbf{16}_1$, $\mathbf{16}_2$, $\mathbf{16}_3$ are used to secure the door 14 to the frame assembly 12. In the interest of simplicity, the following discussion will sometimes use a reference numeral 16 without a subscript numeral to designate an entire group of hinges. For example, the reference numeral 16 will be sometimes used when generically referring to the hinges $\mathbf{16}_1$, $\mathbf{16}_2$ and $\mathbf{16}_3$.

The door 14 includes a rectangular inner door frame 20, an exterior door skin (or facing) 23, and an interior door skin (or facing) 24 secured to opposite sides of the inner door frame 20. The exterior and interior door skins 23 and 24 are formed separately from one another, and typically are identical in appearance. The door skins 23 and 24 are secured, e.g., typically adhesively, to a suitable core and/or to opposite sides of the inner door frame 20 so that the inner door frame 20 is sandwiched between the exterior and interior door skins 23 and 24. Typically, the exterior and interior door skins 23 and 24 are made of a polymer-based composite, such as sheet molding compound ("SMC") or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

The inner door frame 20 includes a pair of parallel, spaced apart horizontally extending top and bottom rails $\mathbf{21}_1$ and $\mathbf{21}_2$, respectively, and a pair of parallel, spaced apart vertically extending first and second stiles $\mathbf{22}_1$ and $\mathbf{22}_2$, respectively, typically manufactured from wood or an engineered wood, such as a laminated veneer lumber (LVL). The top and bottom rails $\mathbf{21}_1$ and $\mathbf{21}_2$ horizontally extend between the first and second stiles $\mathbf{22}_1$ and $\mathbf{22}_2$. Moreover, the top and bottom rails $\mathbf{21}_1$ and $\mathbf{21}_2$ may be fixedly secured to the first and second stiles $\mathbf{22}_1$ and $\mathbf{22}_2$, such as through adhesive or mechanical fasteners. The inner door frame 20 further may include a mid-rail $\mathbf{21}_3$, best shown in FIGS. 3-5. The mid-rail $\mathbf{21}_3$ extends horizontally and is spaced apart from the top and bottom rails $\mathbf{21}_1$ and $\mathbf{21}_2$, respectively, and is typically also manufactured from wood or an engineered wood, such as a laminated veneer lumber (LVL). Moreover, the mid-rail $\mathbf{21}_3$ may be fixedly secured to the first and second stiles $\mathbf{22}_1$ and $\mathbf{22}_2$. The hinges 16 are secured to the first stile $\mathbf{22}_1$, which defines a hinge stile of the inner door frame 20. The door 14 may also include a protective cap 19 made of composite material, best shown in FIG. 4. Specifically, the protective cap 19 can be made from polyvinyl chloride or other weatherable polymer. As further illustrated in FIGS. 3 and 4, the door 14 also includes a vertically extending inner stile $\mathbf{22}_3$, which is adjacent and horizontally spaced from the second stile $\mathbf{22}_2$ so as to define an open vertical channel 25 therebetween. The inner stile $\mathbf{22}_3$ may also be manufactured from wood or an engineered wood, such as a laminated veneer lumber (LVL).

The inner door frame 20 and the exterior and interior door skins 23, 24 of a typical door surround an interior cavity, which may be hollow or may be filled with, for example, corrugated pads, foam insulation, or other core materials, if desired. Thus, the door 14 may include a core 15 disposed within the inner door frame 20 between the exterior and interior door skins 23 and 24. The core 15 may be formed from foam insulation, such as polyurethane foam material, cellulosic material and binder resin, corrugated pads, etc.

Figure 3:
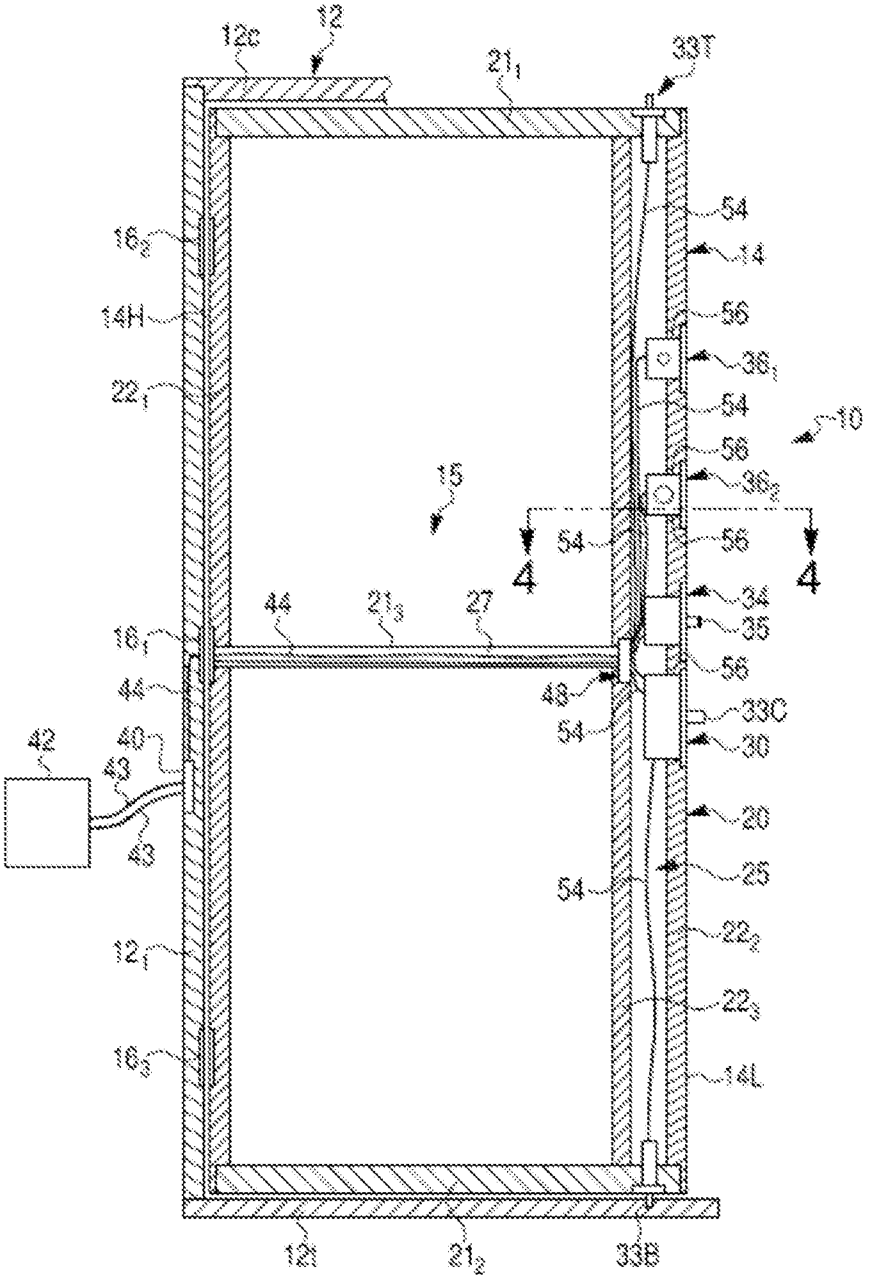
FIG. 3 is an elevational view of the door assembly according to the first exemplary embodiment of the present invention with the exterior door skin omitted to allow viewing of the interior of the door assembly.
Figure 4:
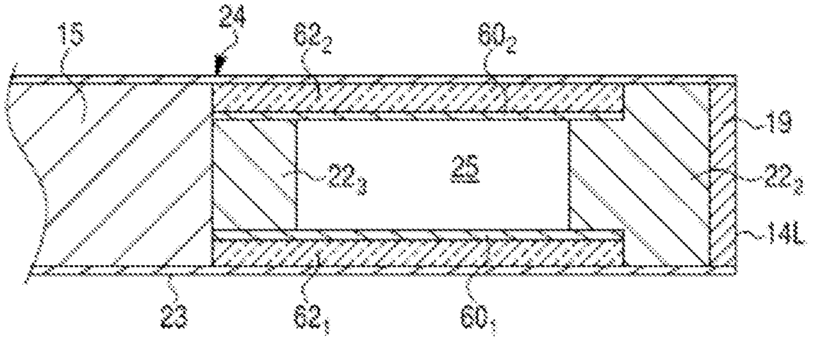
FIG. 4 is a cross-sectional view of a door according to the first exemplary embodiment taken along the lines 4-4 in FIG. 3.

The door assembly 10 comprises a number of electric components (devices) mounted to the door 14 and the door frame 20 and/or adjacent to the door assembly 10 to provide various functions, such as electronic access control, door state feedback, entry camera and audio/video communication, etc. Specifically, the electric devices that may be mounted to or adjacent the door assembly 10 include, but are not limited to, an electric powered door latch 30, an electric powered door lock 34, a doorbell $\mathbf{36}_1$, and a digital camera $\mathbf{36}_2$, as best illustrated in FIG. 3. It should be understood that the door assembly 10 according to the present invention may include other electric devices. In the interest of simplicity, the following discussion will sometimes use a reference numeral without a subscript numeral to designate an entire group of the electric devices. For example, the reference numeral 36 will be sometimes used when generically referring to the electric devices $\mathbf{36}_1$ and $\mathbf{36}_2$.

As best illustrated in FIGS. 1 and 2, the electric powered door latch 30 is a 3-point latch that includes a handle (or knob) 32, a powered central latch 33C, a powered top latch 33T and a powered bottom latch 33B. The handle 32 is manually operable by a user to retract the central latch 33C to allow opening of the door 14 from a closed position to an open position. As further illustrated in FIGS. 1 and 2, the electric powered door lock 34 is a deadbolt device, although other locking systems may be utilized. The electric door lock 34 includes a locking element in the form of a deadbolt 35 operable between an extended or locked position, which prevents opening of the door 14, and a retracted or unlocked position, which allows opening of the door 14. As best illustrated in FIGS. 1-3, the electric powered door latch 30 and the electric powered door lock 34 are mounted to the latch side 14L of the door 14. Specifically, the electric powered door latch 30 and the electric powered door lock 34 are mounted to the second stile $\mathbf{22}_2$, which defines a latch stile of the door frame 20.

As illustrated in FIG. 3, the door assembly 10 further comprises a low voltage (such as 5 volts (V), 12 volts, 24 volts or other required voltage) AC to DC (AC/DC) converter 40 mounted to the frame assembly 12. As best illustrated in FIG. 3, the low voltage AC/DC converter 40 is located in a pocket machined or otherwise formed into the first jamb member $\mathbf{12}_1$ of the frame assembly 12, which is adjacent to the hinges 16 and the first stile of the door frame 20, i.e., adjacent to the hinge side 14H of the door 14. The low voltage AC/DC converter 40 is electrically connected by high voltage wires 43 to a 110 (or 120) V AC power unit 42 installed during home construction or located adjacent the door assembly 10. The low voltage AC/DC converter 40 can be located at a standardized height on the first jamb member $\mathbf{12}_1$ of the frame assembly 12 such as when the AC power unit 42 is installed during home construction. In other words, the AC power unit 42 defines a source of high voltage (i.e., 120 (or 110) volts of standard general-purpose alternating-current (AC) electrical power supply or a high voltage electrical power supply) disposed outside but adjacent the door assembly 10. Typically, the standard 120 (or 110) volts general-purpose AC electrical power supply is known in the USA as grid power, wall power, or domestic power. Other voltages, such as 220 volts, may be used. The low voltage AC/DC converter 40 changes the standard general-purpose alternating-current (AC) high voltage of 120 V to the low voltage of 5 volts DC, 24 volts DC, or other required voltage. Many electric devices operate at 5 volts DC or 12 volts DC, so the AC/DC converter 40 steps down the power and current type to allow typical 120 (or 110) volts general-purpose AC electrical to be available for use at the door assembly 10.

A low voltage supply wire 44 runs from the low voltage AC/DC converter 40 to one of the hinges $\mathbf{16}_1$, $\mathbf{16}_2$, $\mathbf{16}_3$. Specifically, the low voltage supply wire 44 runs to and through the hinge $\mathbf{16}_1$ disposed usually in the middle of the first jamb member $\mathbf{12}_1$ of the frame assembly 12 and provides an electric powered (or electric transfer) hinge that conducts the low voltage electrical power therethrough. In other words, the low voltage supply wire 44 transfers electrical power across the powered hinge $\mathbf{16}_1$. Exemplary electrical hinges are disclosed in U.S. Pat. Nos. 3,860,312, 3,857,625, 3,842,386, 3,838,234, 3,355,695, 1,744,040, 615209, 612192 and US published patent application No. 2017/0306674, 2014/0213073, 2014/0001880, 2012/0073083, the complete disclosures of which are incorporated herein by reference. Alternatively, an electrical power transfer device may be used that transfers low voltage electrical power from the frame assembly 12 to the pivotable door 14.

The supply wire 44 is connected to the powered hinge $\mathbf{16}_1$ on the hinge side 14H of the door 14 and preferably runs through a power supply channel 27 to a DC power distribution block 48 located in or adjacent to the open vertical channel 25 on the latch side 14L of the door 14. The open vertical channel 25 may be accessed before the electric door latch 30 and/or the electric door lock 34 are installed. Electric power can be delivered through the open vertical channel 25 from the DC power distribution block 48 to the electric devices $\mathbf{36}_1$ and $\mathbf{36}_2$ that are mounted to the door 14, specifically into the latch stile $\mathbf{22}_2$.

A plurality of electrical wires 54 electrically connect the power distribution block 48 to the electric powered door latch 30, the electric powered door lock 34, and the electric powered devices $\mathbf{36}_1$ and $\mathbf{36}_2$. Alternatively, electrical connectors may be pre-mounted in the open vertical channel 25 at desired locations so that the electric devices may simply be inserted and plugged into the electrical connectors. A standard flange size and plug location relative to location of a flange of the electric devices may be set so that suppliers may supply electric devices that are easily plugged into the door 14. Desirably the electric devices all have a unique identifier, such as a flange, electrical signal, or electronic handshake in order to verify that the electric device is approved by the manufacturer of door assembly 10. The unique identifier minimizes difficulties if non-approved devices are attempted to be connected to the control system of the invention.

The open vertical channel 25 is formed between the second stile $\mathbf{22}_2$ and the inner stile $\mathbf{22}_3$. As further illustrated in FIG. 4, the open vertical channel 25 is also delimited by a front inner strip $\mathbf{60}_1$ adjacent to the exterior door skin 23, and a rear inner strip $\mathbf{60}_2$ adjacent to the interior door skin 24, both made of appropriate material, such as fiberglass reinforced polymer. A space $\mathbf{62}_1$ between the exterior door skin 23 and the front inner strip $\mathbf{60}_1$ as well as a space $\mathbf{62}_2$ between the interior door skin 24 and the rear inner strip $\mathbf{60}_2$ is filled with appropriate material, such as closed-cell polystyrene foam (e.g., Styrofoam®). The layers of polystyrene foam provide thermal insulation to the open vertical channel 25 so the door 14 will meet energy requirements. The fiberglass reinforced strips $\mathbf{60}_1$ and $\mathbf{60}_2$ provide additional structural support and a barrier between the electric devices 36 and the polystyrene foam. Alternatively, the spaces $\mathbf{62}_1$ and $62_2$ may be made of higher density foam layer, thus eliminating the need for the fiberglass reinforced strips $60_1$ and $60_2$.

The door 14 allows easy integration of the electric devices, while maintaining structural, insulation, and aesthetic requirements of an exterior door. Moreover, slots (or openings) 56, such as of up to 1" in width, may be machined into the latch stile $22_2$ to allow mounting of various electric devices, as best shown in FIG. 3. The slots 56 open into the open vertical channel 25. The connecting wires 54 may be run to the power distribution block 48 or connectors may be pre-mounted to the inner stile $22_3$ in the open vertical channel 25, thus allowing the electric devices to be plugged-in so that electric power can be supplied for use and functioning of the electric devices. Providing electric power to the door assembly 10 and the door 14 minimizes the need for changing batteries, thus assuring more reliable operation and functioning of the electric devices.

Figure 5:
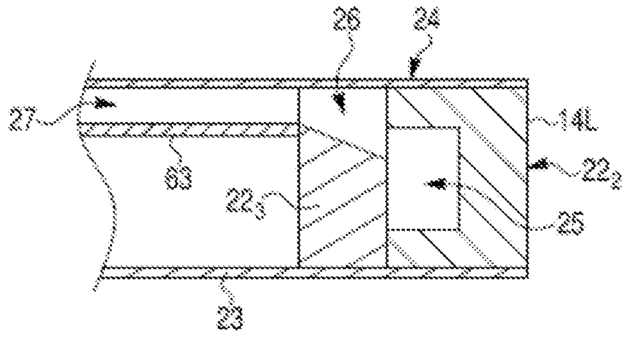
FIGS. 5 and 6 are cross-sectional views of a door according to an alternative exemplary embodiment.
Figure 6:
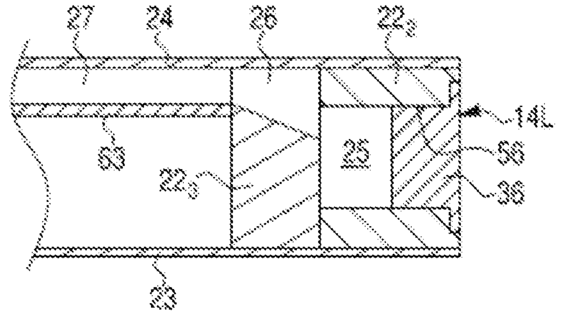

Alternatively, as best shown in FIG. 5, the open vertical channel 25 may be machined into the second stile $22_2$ as a recess extending vertically therealong. The power supply channel 27 extends from the hinge side 14H of the door 14 toward the open vertical channel 25. The power supply channel 27 is formed between the exterior and interior door skins 23 and 24 and an inner strip 63 adjacent to the exterior and interior door skins 23 and 24. The power supply channel 27 is connected to the open vertical channel 25 through a notch 26 formed in the inner stile $22_3$ at the intersection of the open vertical channel 25 and the power supply channel 27. The second stile $22_2$ as illustrated in FIG. 5 may be made of high-density plastic foam, such as PVC, polystyrene, polypropylene, polyurethane, or other plastic foam with a specific gravity greater than 0.4. As further shown in FIG. 6, the electric device 36 is inserted into an opening 56 formed in the second stile $22_2$. The low voltage supply wire 44 runs through the power supply channel 27, while one of the connecting wires 54 extends through the open vertical channel 25 and is electrically connected to the electric device 36, thus electrically connecting the electric device 36 to the low voltage AC/DC converter 40. Similarly, the connecting wires 54 are electrically connected to the electric powered door latch 30 and the electric powered door lock 34, thus electrically connecting the electric powered door latch 30 and the electric powered door lock 34 to the low voltage AC/DC converter 40.

Figure 7:
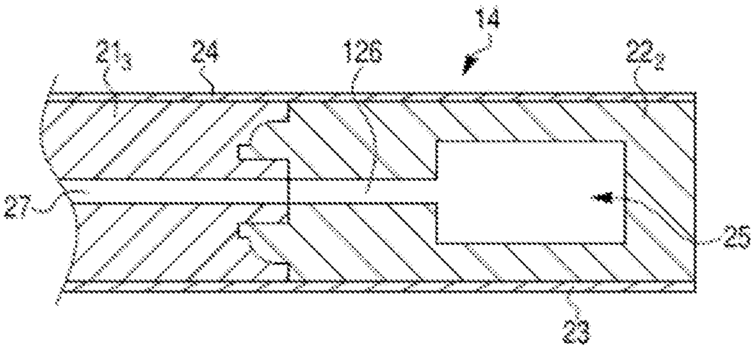
FIG. 7 is a cross-sectional view of a door according to another alternative exemplary embodiment.

Further alternatively, as shown in FIG. 7, the open vertical channel 25 may be machined into the second stile $22_2$ so as to extend vertically therealong. The power supply channel 27 may be machined through the horizontally extending mid-rail $21_3$ and extends from the hinge side 14H of the door panel 14 towards the open vertical channel 25. Moreover, the power supply channel 27 through the horizontally extending mid-rail $21_3$ is connected to the open vertical channel 25 through a connecting conduit 126 in the second stile $22_2$. Alternatively, the power supply channel 27 is formed through the core 15 of the door panel 14.

Figure 8:
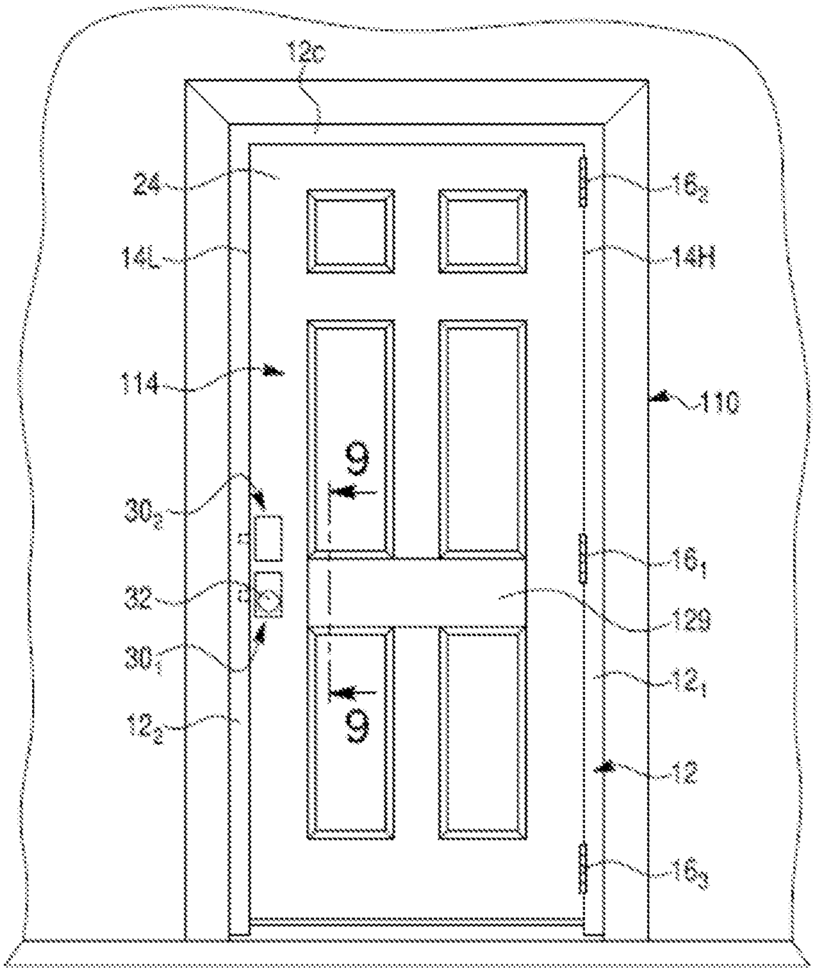
FIG. 8 is an elevational interior view of an exterior door assembly according to a second exemplary embodiment of the present invention.
Figure 9:
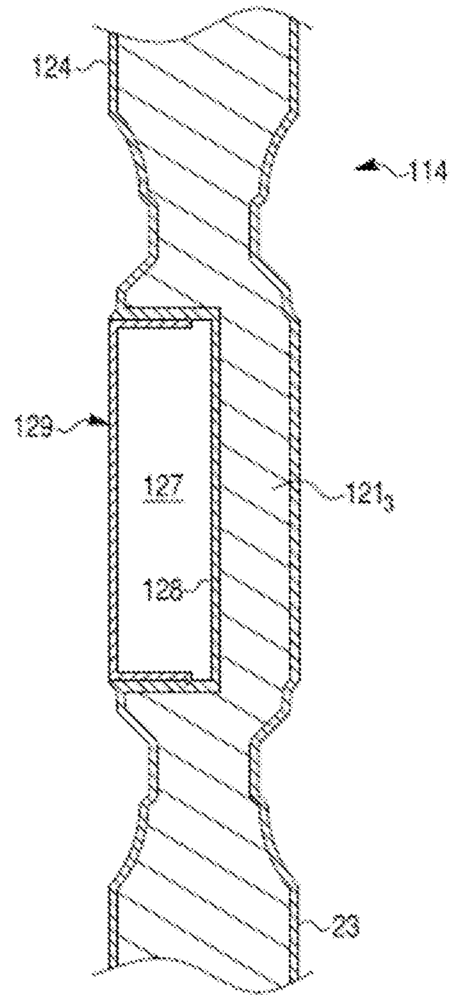
FIG. 9 is a cross-sectional view of the door according to the second exemplary embodiment of the present invention taken along the lines 9-9 in FIG. 8.

FIGS. 8 and 9 illustrate a door assembly, generally labeled with the reference numeral 110, according to a second exemplary embodiment of the present invention. Components, which function in the same ways as in the first exemplary embodiment of the present invention depicted in FIGS. 1-7 are labeled with the same reference characters. Components, which are constructed similar to or function in the same way as in the first exemplary embodiment are designated by the same reference numerals to which 100 has been added, sometimes without being described in detail since similarities between the corresponding parts in the two embodiments will be readily perceived by the reader.

A door 114 of the door assembly 110 includes a mid-rail $121_3$, as best shown in FIG. 9. As further illustrated in FIG. 9, an interior door skin 124 and/or the mid-rail $121_3$ is formed with a horizontally extending and exteriorly open groove (or recess) 128 defining a power supply channel 127 receiving the low voltage supply wire 44 therein. The open groove 128 preferably is covered with a removable cover (or lid) 129. The cover 129 removably snaps into the open groove 128 in the interior door skin 124 of the door panel 114, or is otherwise removably connected thereto.

Figure 10:
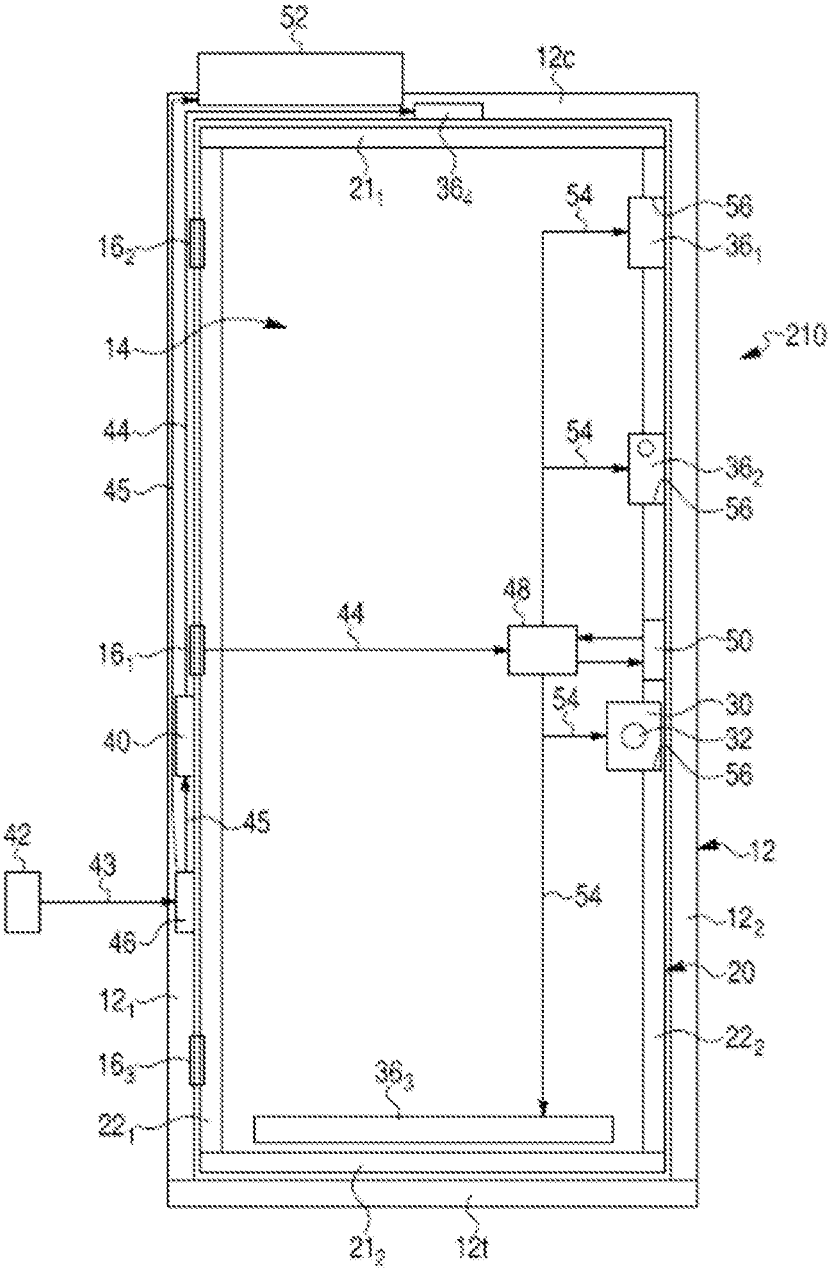
FIG. 10 is an elevational interior view of an exterior door assembly according to a third exemplary embodiment of the present invention without an exterior door skin in order to allow viewing of the interior of the door.

FIG. 10 illustrates a door assembly, generally labeled with the reference numeral 210, according to a third exemplary embodiment of the present invention. Components which function in the same ways as in the first exemplary embodiment of the present invention depicted in FIGS. 1-7 are labeled with the same reference characters. Components, which are constructed similar to or function in the same way as in the first exemplary embodiment are designated by the same reference numerals to which 200 has been added, sometimes without being described in detail since similarities between the corresponding parts in the two embodiments will be readily perceived by the reader.

As illustrated in FIG. 10, the door assembly 210 comprises a plurality of electric devices 36 integrated into the door assembly 210. Specifically, the door 14 of the door assembly 210 includes at least four electric devices $36_1$-$36_4$ mounted thereto, as illustrated in FIG. 10. The electric devices may include, but are not limited to a doorbell, a digital camera, LED lighting, etc. It should be understood that the door 14 of the door assembly 210 according to the present invention may include any other electric devices, as there are a number of electric devices marketed to be mounted to doors and provide functions such as electronic access control, door state feedback, entry camera and communication, etc. Moreover, the electric devices $36_1$-$36_4$ are typically low-voltage DC electric devices operated by low voltage DC electrical power (such as 5 volts (V), 24 volts or other required voltage).

The electric devices that may be mounted to the door assembly 210 include, but are not limited to, an electric powered door latch 30, an electric powered door lock 34, a doorbell $36_1$, a digital camera $36_2$, a threshold LED light $36_3$ and an entryway illumination light with a motion detector $36_4$, as best illustrated in FIG. 10. The threshold LED light $36_3$ may illuminate when an authorized person is recognized or when a person approaches the door 14. It should be understood that the door assembly 210 may include other electric devices. In the interest of simplicity, the following discussion will sometimes use a reference numeral without a subscript numeral to designate an entire group of the electric devices. For example, the reference numeral 36 will be sometimes used when generically referring to the electric devices $36_1$-$36_4$.

During the installation of the digital camera $36_2$, the exterior door facing 23 is drilled at a predetermined place for exposing a lens of the digital camera $36_2$. The digital camera $36_2$ may be fixed to the exterior door facing 23 by a bezel (not shown) when the digital camera $36_2$ is received in the corresponding slot 56. Moreover, the bezel preferably prevents humidity, moisture, water, or rain penetration inside the door 14 and may also serve to harden the digital camera $36_2$ in order to minimize tampering, for example.

Moreover, the door assembly 210 comprises an electric powered door latch 30 operated at low voltage DC electrical power, and a powered door opener (or electric door operator)

52 mounted to the frame assembly 12 and operated by high voltage AC electrical power 120 volts. The electric powered door latch 30 may have a lighted doorknob 32 and a lighted keyhole, which illuminate when an authorized person is recognized.

As best illustrated in FIG. 10, the door assembly 210 further comprises an AC distribution unit 46 mounted to the frame assembly 12. The AC distribution unit 46 preferably is located in a pocket machined or otherwise formed into the first jamb member $\mathbf{12}_1$ of the frame assembly 12, which is adjacent to the hinges 16 and the first stile of the door frame 20, i.e., adjacent to the hinge side 14H of the door panel 14. The AC distribution unit 46 is electrically connected to a 120 (or 110) V AC power unit 42 installed during home construction. The AC distribution unit 46 also is electrically connected to a low voltage AC to DC (AC/DC) converter 40 located in a pocket machined into the first jamb member $\mathbf{12}_1$ of the frame assembly 12, which is adjacent to the hinges 16 and the first stile of the door frame 20, i.e., adjacent to the hinge side 14H of the door panel 14. In this way, the 120 V AC power is distributed by the AC distribution unit 46 and to the low voltage AC/DC converter 40 mounted in the frame assembly 12, and to at least one other electric device mounted into or on the frame assembly 12, such as the powered door opener 52, through a high-voltage supply wire 45, shown in FIG. 10.

Low-voltage supply wires 44 run from the low-voltage AC/DC converter 40 to one of the hinges $\mathbf{16}_1$, $\mathbf{16}_2$, $\mathbf{16}_3$. Preferably, the low voltage supply wires 44 run to and through the hinge $\mathbf{16}_1$ disposed in the middle of the first jamb member $\mathbf{12}_1$ of the frame assembly 12 and defines a powered (or electrical) hinge that conducts the low voltage electrical power. The low voltage supply wires 44 transfer low-voltage DC electrical power across the powered hinge $\mathbf{16}_1$. The low-voltage supply wires 44 are connected to the powered hinge $\mathbf{16}_1$ on the hinge side 14H of the door panel 14 and runs to a power distribution block 48. Low-voltage DC electrical power is delivered from the power distribution block 48 to the electric powered door latch 30 and the electric devices $\mathbf{36}_1$-$\mathbf{36}_3$ that are mounted to the door 14. Moreover, the low-voltage DC electrical power is delivered from the low-voltage AC/DC converter 40 directly to the low-voltage electric device $\mathbf{36}_4$ that is mounted to the frame assembly 12 by the low-voltage supply wires 44 so as to bypass the DC power distribution block 48, as shown in FIG. 10.

As illustrated in FIG. 10, the door assembly 210 further comprises a battery (or battery pack) 50 that may slide into one of the stiles (e.g., the second stile $\mathbf{22}_2$) of the door frame 20. The battery 50 is electrically connected to the DC power distribution block 48. The battery 50 has a low nominal voltage (such as 5 volts (V), 24 volts or other required voltage). The nominal voltage of the battery 50 corresponds to an output voltage of the low voltage AC/DC converter 40. The door assembly 210 is powered and operated by the electrical power of the battery 50 as a primary or as a secondary back-up electrical power source for the powered door latch 30 and the electric devices $\mathbf{36}_1$-$\mathbf{36}_4$. Preferably, the battery 50 is also connected to the DC power distribution block 48 for back-up as well as to provide additional amperage for momentary, high amperage devices such as the powered door latch 30. Preferably, the battery 50 is a rechargeable battery that is charged from the DC power distribution block 48. Thus, in the door assembly 210, the reliance on batteries as a primary power source is less important, or if a battery option is used, a larger consolidated battery 50 may be stored in the door 14 and not in each of the electric devices. In an embodiment, the battery 50 may be provided with a heater and temperature sensor to ensure that the battery operates within its optimal temperature range. The battery 50 may also include sensors (e.g., voltage and current sensors) to detect fault conditions for safe operation 120 V AC electrical power can also be connected to the door 14 from the AC distribution unit 46 if AC voltage is needed in the door 14. The door 14 can be constructed with multiple prewired receptacles where electric devices and/or the battery 50 can simply be plugged into an edge of the door 14 and a cover plate installed to enclose the electric devices. Ventilation preferably is provided in the cover plate to aid in heat transfer, or a conduit may be connected to the receptacles and vent air out a top of the door 14.

A door assembly according to the present invention includes a power system that can provide both high-voltage and low-voltage electrical power for operation of a plurality of the electric devices integrated into the door assembly and/or adjacent to the door assembly. For the plurality of the electric devices integrated in the door assembly, the range of watts required, considering amperes and volts specifically required by each of the electric devices and use, varies widely from LED lighting at the low end, 2.9 watts per foot at 5 volts, to electromechanical door systems requiring extremely high amp output to move a door, typically over 500 watts at 120 volts. Thus, the present invention provides two or more power supply options that better match power needs of electric devices to allow for easier integration and power management given the diversity of power requirements.

By providing a convenient way to integrate the electric devices (hardware) into the door assembly with power available, manufacturers of the electric devices can simplify the designs and provide consumers with cleaner designs that are hidden and integrated into the door and do not require replacement of batteries. Furthermore, the invention enables integration of the electric devices into the door assembly in a standardized way that allows convenient serviceability of the electric devices.

The electric devices are integrated into or adjacent the door assembly so that the door assembly maintains structural integrity, insulation performance, and is free of distortion or other aesthetic defects. Preferably, referring to FIGS. 1 and 3, the electric devices may include, but not limited to, an electric power door latch 30 (FIG. 3), an electric power door lock 34 (FIG. 3), a doorbell $\mathbf{36}_1$ (FIG. 3), a digital camera $\mathbf{36}_2$ (FIG. 3), a light 37 (preferably LED light, FIG. 1), door open/closed sensor 38 (FIG. 1), or combinations thereof. Although the drawings show the electric devices in particular positions on the door, those skilled in the art would recognize that other positions on the door are also appropriate for the invention.

Figure 11A:
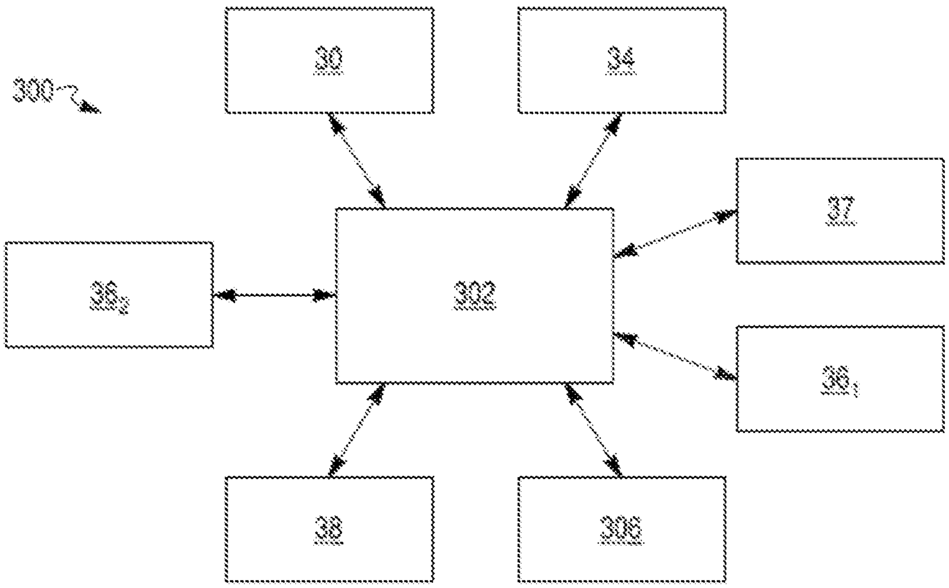
FIGS. 11A, 11B, and 11C are schematics showing alternative communication configurations of the door control system.
Figure 11B:
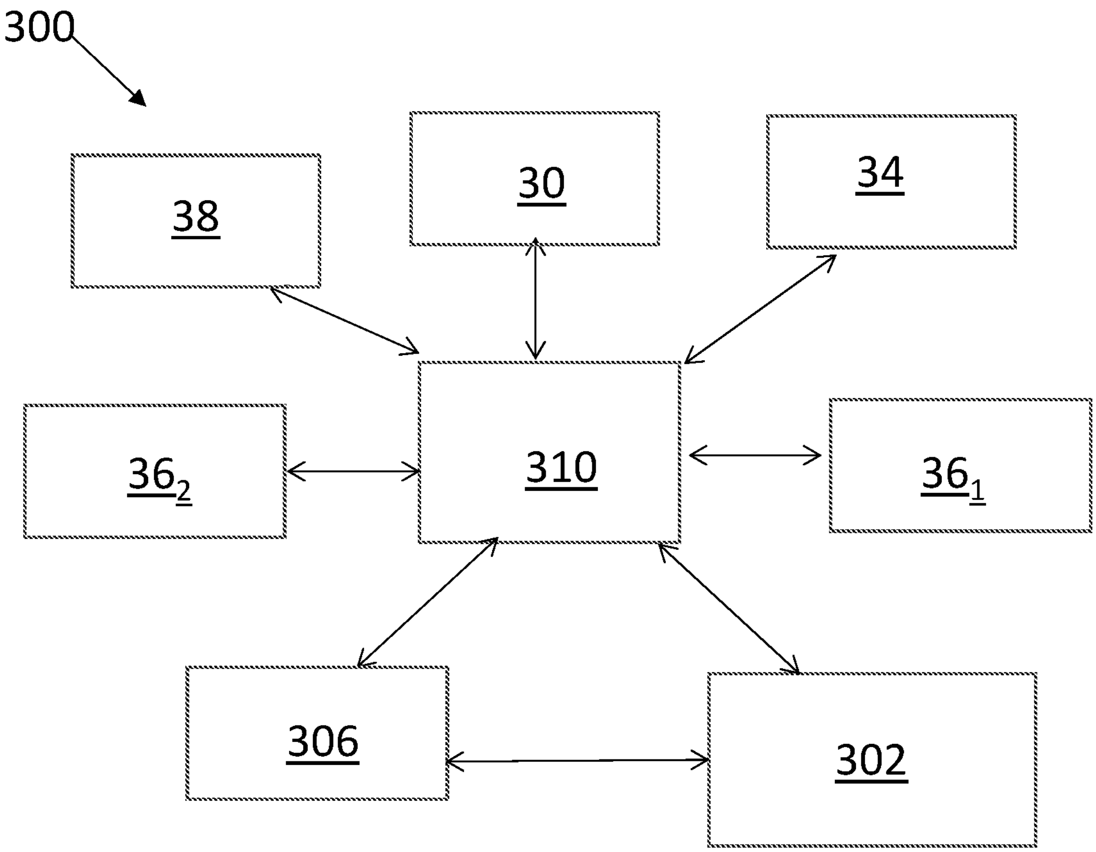
Figure 11C:
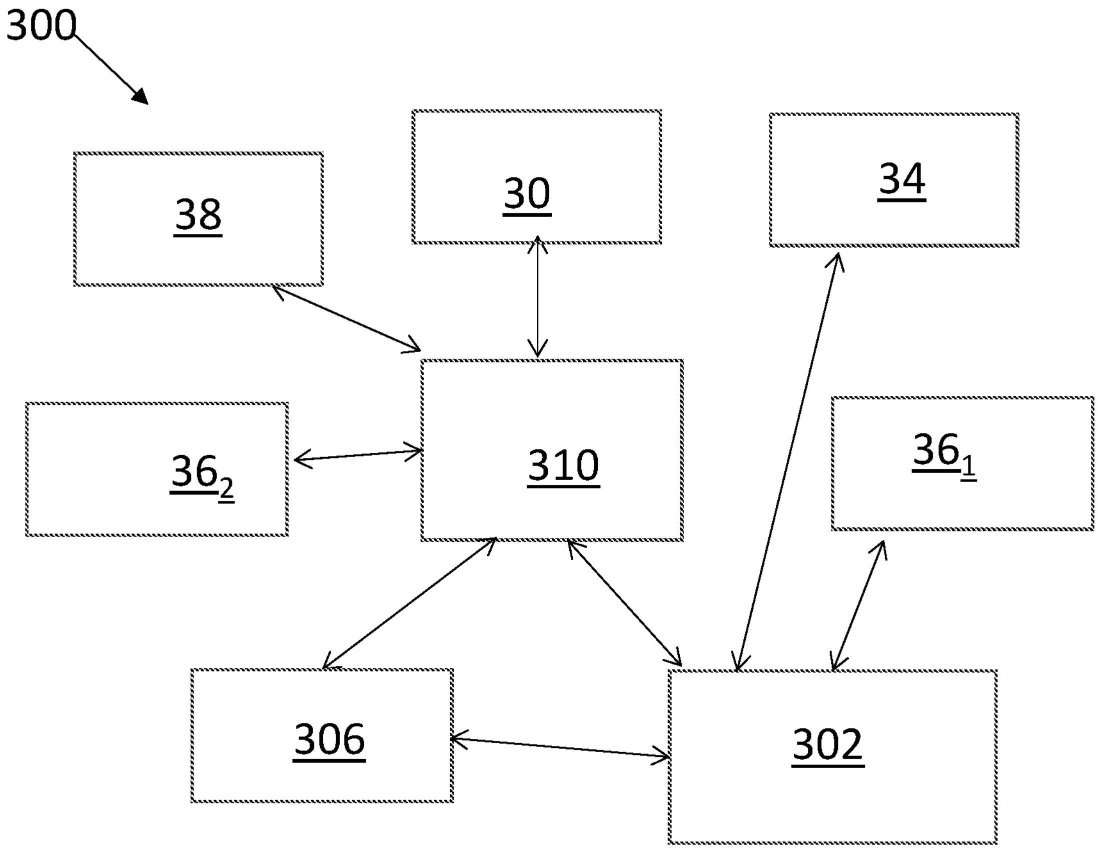

As shown in FIGS. 11A and 11B, the electric devices are integrated with a door control system 300, preferably a computerized system provided with hardware and software platforms, including a main system 302 in electronic communication with the electric devices, such as the electric powered door latch 30, electric powered door lock 34, doorbell $\mathbf{36}_1$, digital camera $\mathbf{36}_2$, light 37, and/or door open/closed (door state) sensor 38, for receiving information from and controlling the electric devices. The doorbell $\mathbf{36}_1$ may also incorporate a peephole and/or integrate with the camera $\mathbf{36}_2$ to facilitate viewing the exterior side of the door from the inside. The main system 302 may be a located on one or more servers or preferably located on the cloud. The electric devices are in electronic communication with the main system 302 for receiving and sending information and data, receiving power, and receiving operating commands, such as to open the powered door lock 30. The electric devices may communicate directly with the main system 302, as shown in FIG. 11A, or may be connected to the main system 302 via a main controller 310 located in the door 14, as best shown in FIG. 11B. In that case, the controller 310 is preferably located in the door 14 and monitors operating conditions of the electric devices and controls their operation. [.] The controller 310 also monitors operation conditions and controls the battery 50 while it is being used as a power source and while it is being charged when line power is available. Communication between the controller 310 and the electric devices may be wireless or by wired connection. Although FIG. 11B shows all electric devices communicating with the main system 302 via the controller 310, it is possible for some of the electric devices to communicate with the main system 302 via the controller 310, while other electric devices communicate with the main system 302 directly. An example is shown in FIG. 11C, where the powered door lock 34 and door bell $\mathbf{36}_1$ communicate directly with the main system 302, and the other electric devices $\mathbf{36}_2$, 30, and 38 communicate with the main system 302 via the controller 310. Preferably, the electric devices communicate with the main system 302 and/or the controller 310 via wireless technologies and protocols for electronic communication such as cellular (3G/4G/5G), Bluetooth, Bluetooth Low Energy, WiFi, TCP/IP, near field communication (NFC), and other such technologies and protocols. Preferably, communication between the electric devices and the main system 302 is encrypted to ensure security.

The controller 310 and and/or the main system 302 communicate with a control device 306, such as a smartphone, tablet computer, smartwatch, computer, and the like. The control device 306 is provided with hardware and software platforms (such as application software installed on the control device 306) for electronic communication with the main system 302. The software may be, e.g., in the form of an application that is installed on the control device 306. The control device 306 preferably communicates wirelessly with the main system 302 and the controller 310. The control device 306 communicates with the remotely located main system 302 electronically through electronic communication devices which may include sensors, gateways, switches, routers, hubs, or like electronic communication devices. The control device 306 may transmit information and/or instructions directly to the main system 302 and/or the controller 310. Preferably, the control device 306 communicates with the main system 302 and/or the controller 310 only upon activation of the installed software, such as an application, on the control device 306, by a user. The communication between main system 302 and/or the controller 310 and the control device 306 preferably uses wireless technologies and protocols for electronic communication such as cellular (3G/4G/5G), Bluetooth, Bluetooth Low Energy (BLE), WiFi, TCP/IP, near field communication (NFC), and other such technologies and protocols. Preferably, communication between the control device 306 and the main system 302 is permitted only upon receipt of proper log-in credentials (login name and password), more preferably using two-factor identification. Typically, the user activates the software, e.g., application on the control device 306, which prompts the user to enter the log-in credentials that are unique to that user and/or door assembly. The communication is also preferably encrypted. Preferably, communication between the controller 310 and the main system 302 occurs over WiFi; communication between the controller 310 and the control device 306 occurs over Bluetooth; communication between the main system 302 and the control device 306 occurs over WiFi; communication between the electric devices and the controller 310 occurs over wired connections (communication bus); and communication between the electric devices and the main system occurs over WiFi.

On starting the application software for the first time on the control device 306, the user is asked to register for an account with log-in credentials unique to that user and/or door assembly. The user's account is also linked to the particular door assembly. To link the door assembly to the account, the user may be asked to scan a Quick Response ("QR") code, bar code, or other unique identifier, preferably located on the door. The QR code includes a unique identifier for the door and is used to link that particular door and thus to the user's account, which allows the user to control, configure, and receive information from the electric devices on that door. More than one door may be registered to a single account. The user may also give permission to other account holders, e.g., family members, to access the door. During the registration process, each door is linked to the main system 302, e.g., via WiFi, and is joined to the user's home network.

By using software, e.g., an application on the control device 306, the user can ascertain information on whether the electric devices are communicating with the main system 302 or not (online or offline), whether the electric devices are on battery or line power, whether the electrical devices are operating, and whether the door is opened or closed (door state), view camera images and videos from the camera $\mathbf{36}_2$ and control the camera angle, control lighting levels, and read sensor values, such as battery temperature sensor, door state sensor, motion sensor, and/or optical (daylight) sensor. The software, when operating on the control device 306 provides a secured connection to the main system 302. More than one door may be associated with the account, e.g., a front door and a back door to a home. The application allows the user to control the electric devices using the control device 306. Preferably, as explained below, different applications are provided for users and installers. For users, the instruction manuals that come with the door 14 inform the user to download the application onto the control device 306. The instruction may include a QR code, which takes the user to a website to download the user application. For installers, the manufacturer provides a link for the installer to download the installer application. It is important for safety and security that the installer not be able to register the door and be able to control the electric devices, in order to prohibit the installer from setting up a way to access the door after the user has set up the user account.

In addition to obtaining information about the electric devices on the door, the application software allows the control device 306 to control various functions of the electric devices. For example, the control device 306 may be used to control the lighting level of the light 37, such as to lower or increase the light intensity, to turn the light on or off, to set the lighting to a preset setting, such as motion enable lighting, open/close controlled lighting, or set dusk to dawn lighting. The control device 306 may also be used to lock or unlock the door lock 34, and to turn on or off the camera $\mathbf{36}_2$. In addition to controlling and receiving information from the electric devices, the control device 306, via the application software platform, may be used to contact the manufacturer of the door for trouble shooting, technical support, manufacturer diagnostics, etc. Functions and features of the control system 300 are summarized in Table 1 below:

TABLE 1

| Feature | Performance Target |
|---|---|
| 1. Integrated Power Hub (Power Supply Unit) | Provide power from main power supply to all connected/integrated devices within the door assembly (LEDs, motion sensor, video doorbell, lock, sensors) and is located within the header of the frame. |
| 2. Connectivity | Allows the door to connect to the homeowner's Wi-Fi. The door will also connect to a user's phone via Bluetooth for sharing of Wi-Fi credentialsThis process is triggered by a manual button press on the door. |
| 3. LED at top of door - Overhead LED Strip | LED light strip installed along the top of the exterior door frame on an inswing unit so the doorway can be found in the dark when LED is turned on.<br>For outswing door, the LED acts as an overhead entry light and is not seen from the exterior side/in the middle of the jamb. |
| 4. LED at door lock - spotlight | LED light installed in the door frame adjacent to the smart door lock and handle so the lock can be found in the dark when LED is turned on. |
| 5. LED at door threshold - spotlight | LED at the exterior door threshold so the threshold can be seen in the dark when LED is turned on. |
| 6. Motion Sensor | Detects motion in front of the door and communicates with the LED to turn on when motion is detected. Motion will be detected as someone approaches the door and will be on by the time someone is at the welcome mat in front of the door. Minimum of 5 feet radius but can work up to 10 ft.<br>The motion sensor detects motion with an angle of approach from 30-degrees to 150-degrees from the plane of the door. The motion sensor is configured to prevent detecting motion that is >12ft awayHowever, this is dependent on the installation. If the door is on an elevated porch (stairs going up to the front door) the sensor can detect a further distance by virtue of the fact that the door is elevated above the ground. |
| 7. Integrated video doorbell with peephole | Video doorbell installed within/flush with the door. Peephole provides 120 degrees of visibility, microphone works 100% of the time. Doorbell installed opposite of the control box side of door. No batteries requiredUnit will be powered by the door. |
| 8. Integrated smart lock | Touchscreen smart lock with WiFi hub and keyway to be installed on the door and powered via internal wiring. No batteries required. Lock able to lock and unlock via keypad or keyway. |
| 9. Battery Backup | If power is lost, battery powers the door and the devices for at least 24 hr.<br>The battery is wrapped in an aluminum bracket on one side and insulated foam on the other side. The insulation provides protection from extreme temperatures and the aluminum bracket creates a heat sink to the interior side of the door (which temperature controlled).<br>Battery heater adhesive strip is applied to the battery pack that provides warmth to the cells so the cells do not get too cold in order to keep the battery in temperature range so it can continue to work even in lower temperatures. |
| 10. Door State Sensor | Detects open/close state of the door. Sensor is magnetic or reed switch. |
| 11. AConsumer application | Consumer facing application on control device 306<br>Create user account<br>Add door to user account/app<br>Name door in user account/app<br>Create home/input address in user account/app<br>Add users to door/invite others<br>View door online/offline status<br>View doorbell powered status<br>View smart lock powered status<br>View LED light status<br>View door state status - whether door is open or closed<br>View if door is on battery power or line power<br>User will be able to select three automated settings for lightingcontrol: dusk to dawn or motion enabled, door-state - guest controls cannot control this setting<br>Turn LEDs on/off manually this overrides automatic settings<br>"Contact Support" with Segmented options: Account setup, installation, use case (door is offline, xyz sensor not working)<br>Privacy Information/Policy<br>Notification Management<br>Two-factor authentication<br>Ensure contact P + C Support documents (KBAs and FAQs) and options are easy to access and available |
| 11B. Manufacturing and Installer mobile application | Manufacturing and Installer App<br>Installer and Manufacturing Plant Employee:<br>Run the door diagnostics<br>Automatic<br>Manual<br>Privacy Information/Policy<br>Installer Only:<br>Create and use installer login<br>Contact Support by phone, e-mail, or messaging<br>Create a Ticket for documenting an installation issue to be resolved<br>Receive resolution of the installation issue on ticket<br>Ensure contact Support documents (knowledge base articles (KBA) and FAQs) |

TABLE 1-continued

| Feature | Performance Target |
|---|---|
| | and options are easy to access and available<br>Saving of Diagnostic Results to main system<br>Manufacturing Plant Employee Only<br>Printing capabilities<br>Reporting capabilities |
| 12. Access to battery | Homeowner and installer can view the battery backup area for maintenance. |
| 13. Serviceability | Homeowner and installer able to access wire connectors to be able to swap out a defective integrated item: lock, doorbell, LEDs, sensors. |
| 14. Daylight sensor | Allows LEDs to be controlled by amount of light in the environment to provide sunrise to sunset LED functionality. If motion is detected, the LEDs will only turn on when it is dark. |

Figure 16:
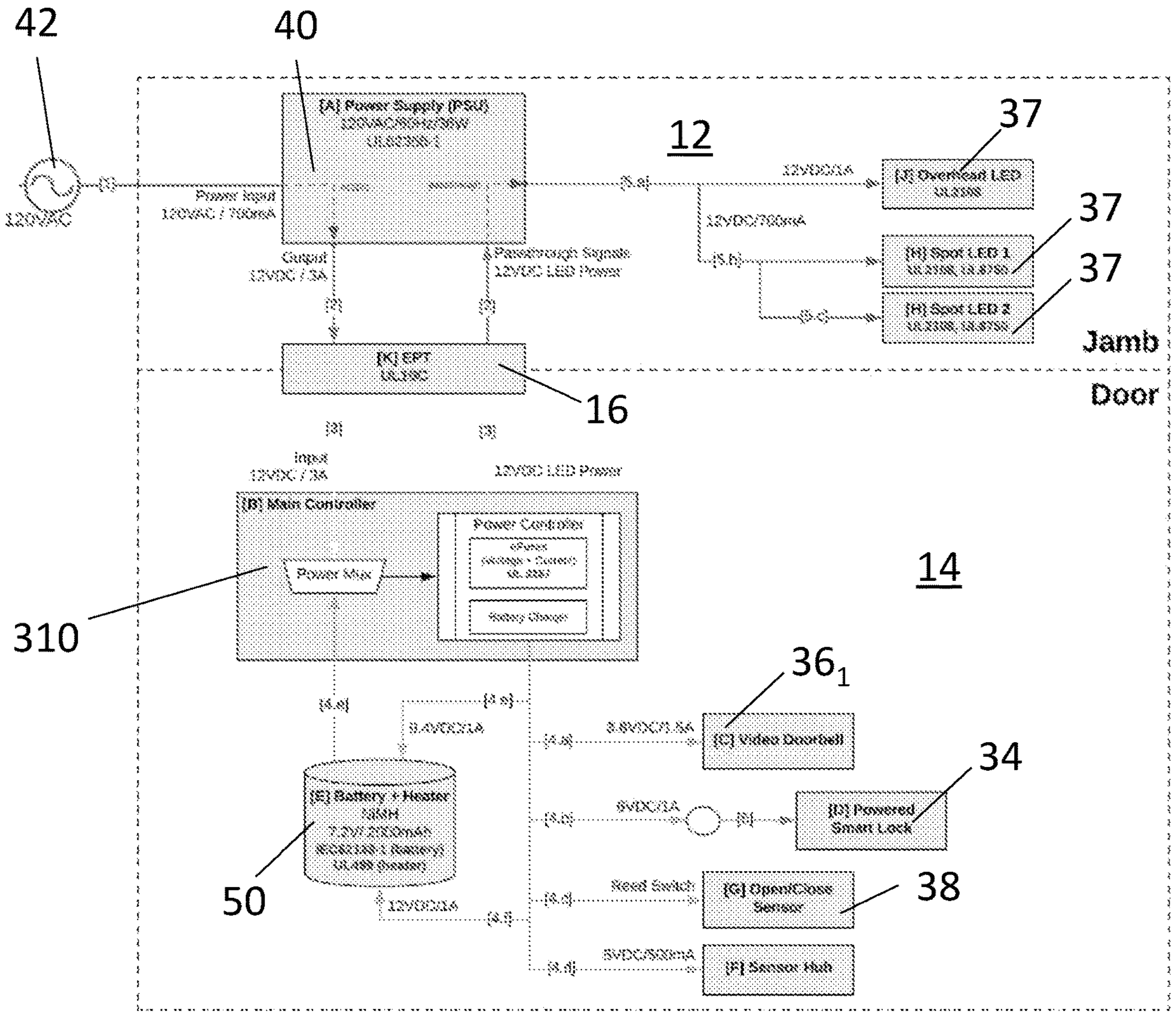
FIG. 16 is a schematic showing an exemplary power architecture for the door assembly.

In addition to communication via the controller 310, the electric devices are also connected to electrical power (line power and/or battery) via the controller 310. FIG. 16 depicts an exemplary power architecture for the electric devices. In that architecture, the AC/DC converter 40 receives AC line power from the power unit 42, converts it to DC, and sends the DC power to the controller 310. As shown in FIG. 16, the DC power is sent to the controller 310, such as through one of the hinges 16 on the door 14 or through an electric power transfer device, such as provided through an electric cable. The controller 310 uses the power to charge the battery 50 and to distribute power to the electric devices (e.g., LEDs 37, doorbell 36$_1$, powered door lock 34, door status sensor 38, and sensor hub 39, as shown in FIG. 16). As shown in FIG. 16, power is preferably distributed to the LEDs 37 through a passthrough in the AC/DC converter 40. When line power is not available, the controller 310 receives power from the battery 50 to operate the electric devices.

Figure 12:
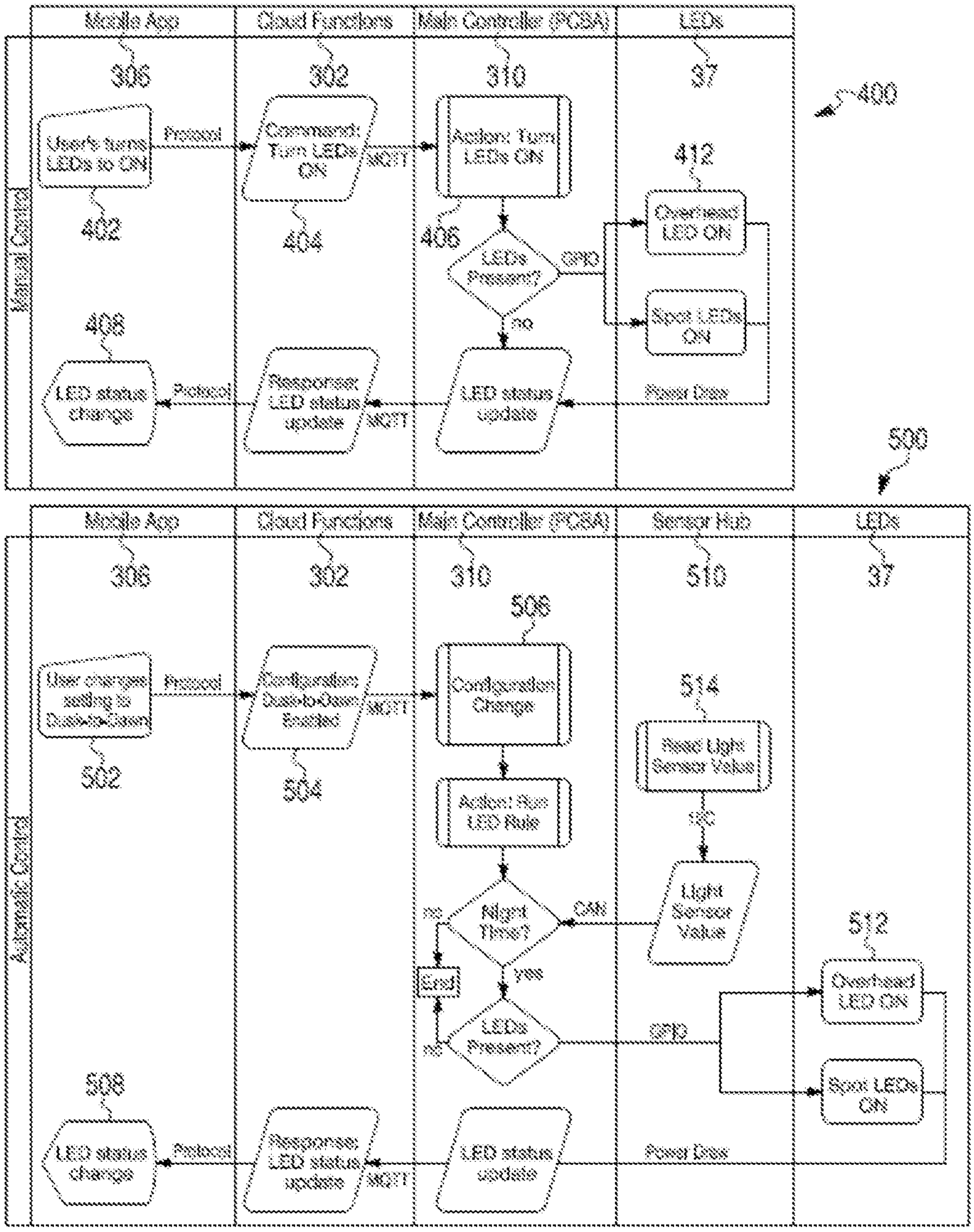
FIG. 12 is a flow diagram for lighting control operation of the door assembly.

FIG. 12 shows an example of a lighting control operation in accordance with the present invention. The lighting control operation may be initiated via the user mobile application software on the control device 306. The user may select manual control 400 or automatic control 500 of the LEDs 37. In manual mode 400, the user may turn on the LEDs 37 by entering a command on the control device 306 (box 402) through a user interface. The command is communicated wirelessly to the main system 302 which operates the LEDs 37 on the door 14 (box 404). The signal from the main system 302 to the LEDs 37 may be transferred via the controller 310 on the door 14 (box 406). Once the LEDs 37 are on (box 412), the LED status on the control device 306 is changed to indicate that the LEDs are "on" (box 408). It can be understood from FIG. 12 that the controller 310 may be connected to a plurality of LEDs, such as an overhead LED, a spot LED, and a threshold LED, all of which are controllable through the control device 306 and the user application software.

In automatic control 500 mode, the user may select, via the user interface (of the user mobile application) on the control device 306 or a local controller on or adjacent the door, a dusk-to-dawn setting for the LEDs 37 (box 502), for example. The command is communicated wirelessly to the main system 302, which activates the dusk-to-dawn setting on the controller 310 on the door 14 (box 506). The controller 310 coordinates with a light sensor 510 to determine the natural lighting levels (box 514). If the natural lighting level is at or below nighttime levels, the LED 37 is turned on (box 512). Once the LED 37 is on (box 512), the LED status on the control device 306 is changed to indicate that the LED is "on" (box 508). Other sensors, such as the door status (open/close) sensor and the motion sensor, may also be used to control the LED lighting. For example, if motion is detected in the dark, the LED 37 is turned on. Likewise, if the door is opened in the dark, then the LED is turned on. In addition, the control device 306 contains software instructions enabling the user to set a schedule that is used to control the LED to turn on/off at a preset time of day. For example, the user may schedule the LED to turn on between 9 PM and 6 AM and to be off at other times.

Figure 13:
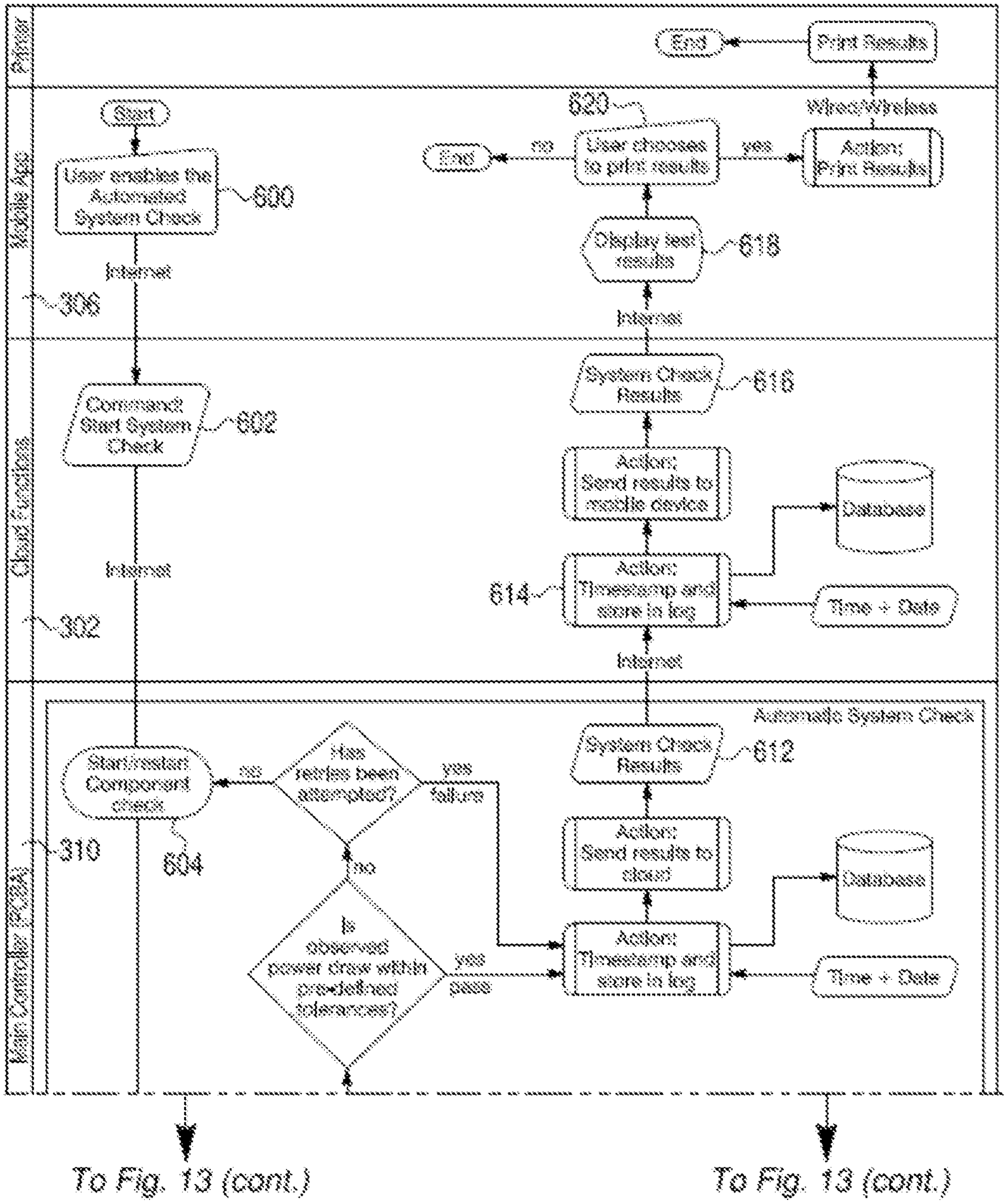
FIG. 13 is flow diagram for automated system check operation of the door assembly.
Figure 13:
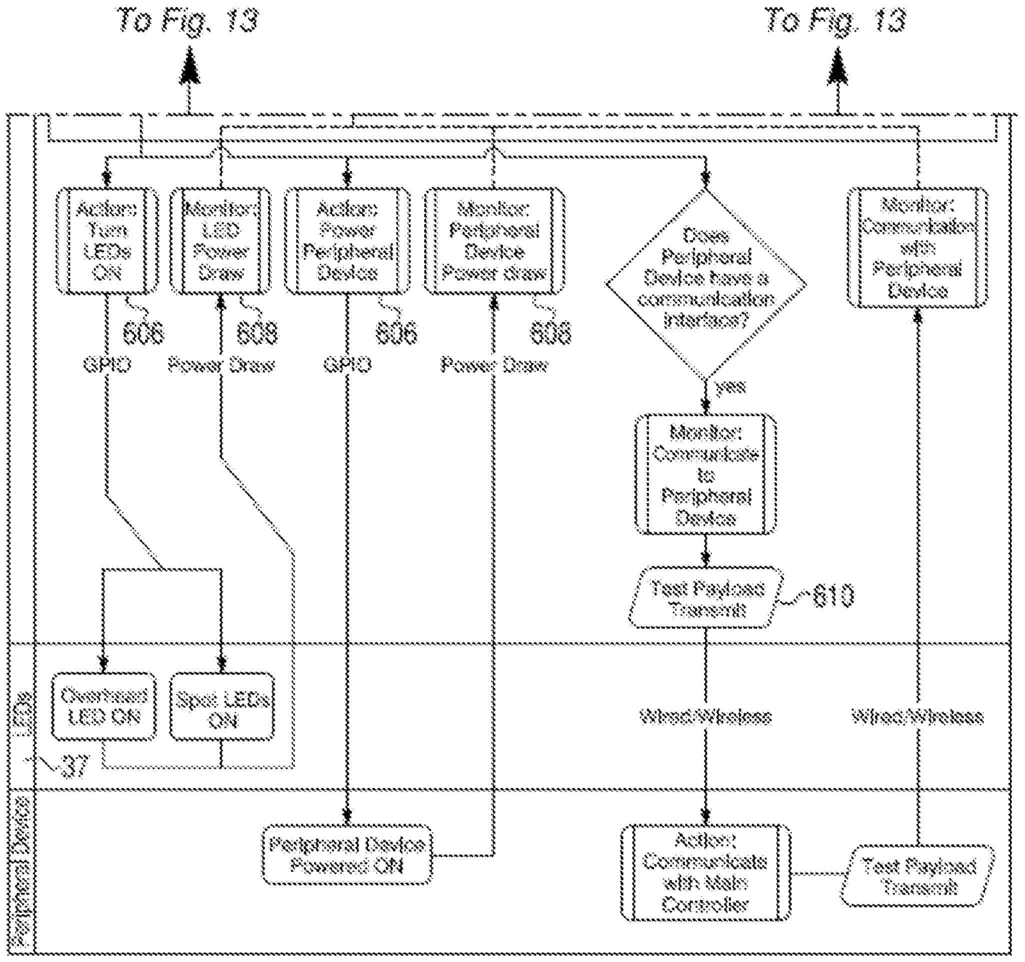

FIG. 13 shows an example of an automated system check in accordance with the present invention. On the control device 306, the user may, through the user interface, enable the automated system check (box 600). On the user's command, the main system 302 starts the system check function (box 602) which is communicated to the controller 310 which initiates checks to determine the status of the electric devices (box 604). The checks include turning on the electric devices (boxes 606) and monitoring their power draws (box 608). The controller 310 preferably includes circuitry to capture analog values of the voltage and current of the electric devices, and uses the values to monitor power draw. If a particular electric device contains a communication interface, the system check also include testing and monitoring of communication to and from the electric device (box 610). In that case, the controller 310 sends a message to the electric device and monitors whether a correct response is generated. Additionally, the controller 310 may receive a "heartbeat" message that is sent periodically from the electric devices to ensure proper communication with the electric devices. The results of the automated system check are collected and transmitted to the main system 302 (box 612) which, in turn, saves the results (box 614) on the main system 302 [and sends (box 616) the results to the control device 306. The results of the automated system check are displayed on the control device 306 (box 618). The user then has the option to print the results to a printer (box 620) or to save them. The system check is used to ensure the electric devices are installed correctly and are operating as expected.

Figure 14:
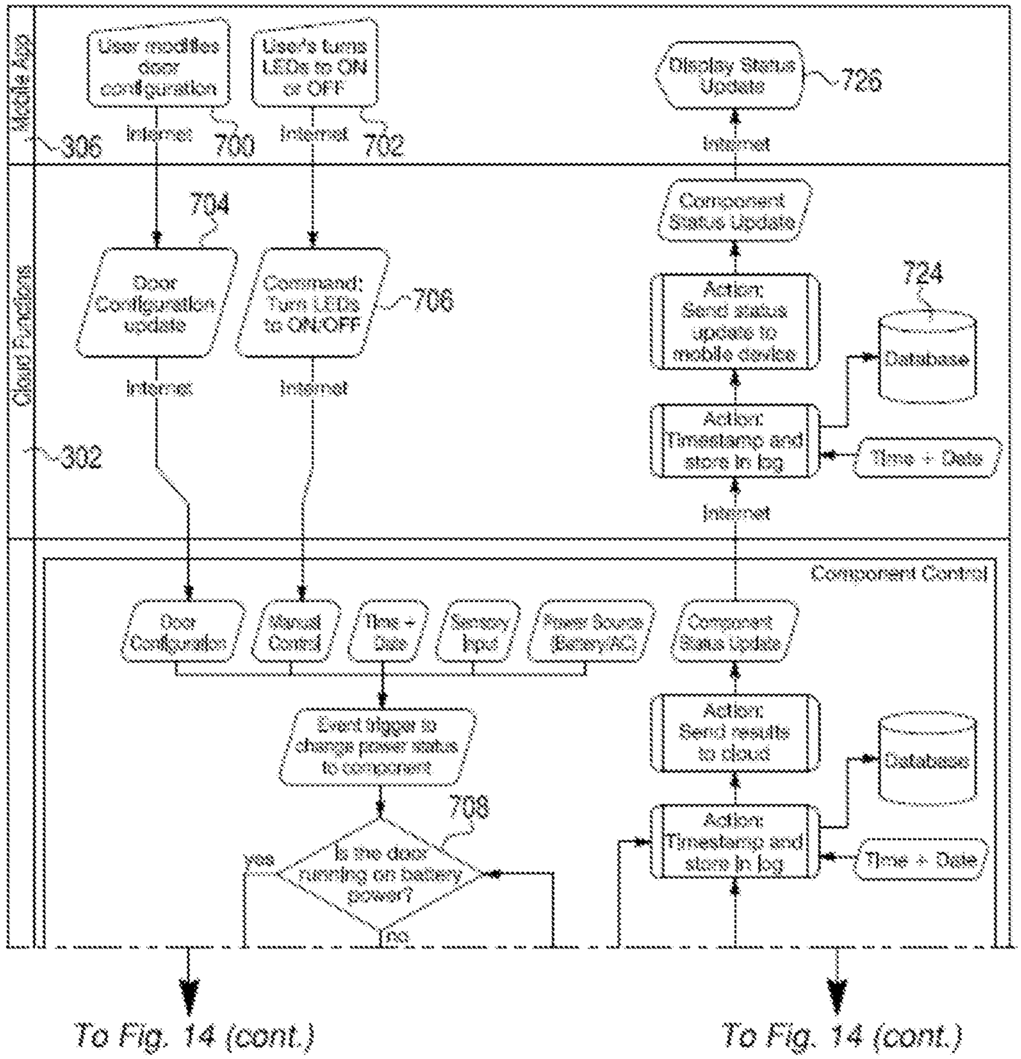
FIG. 14 is a flow diagram for power management functioning of the door assembly.
Figure 14:
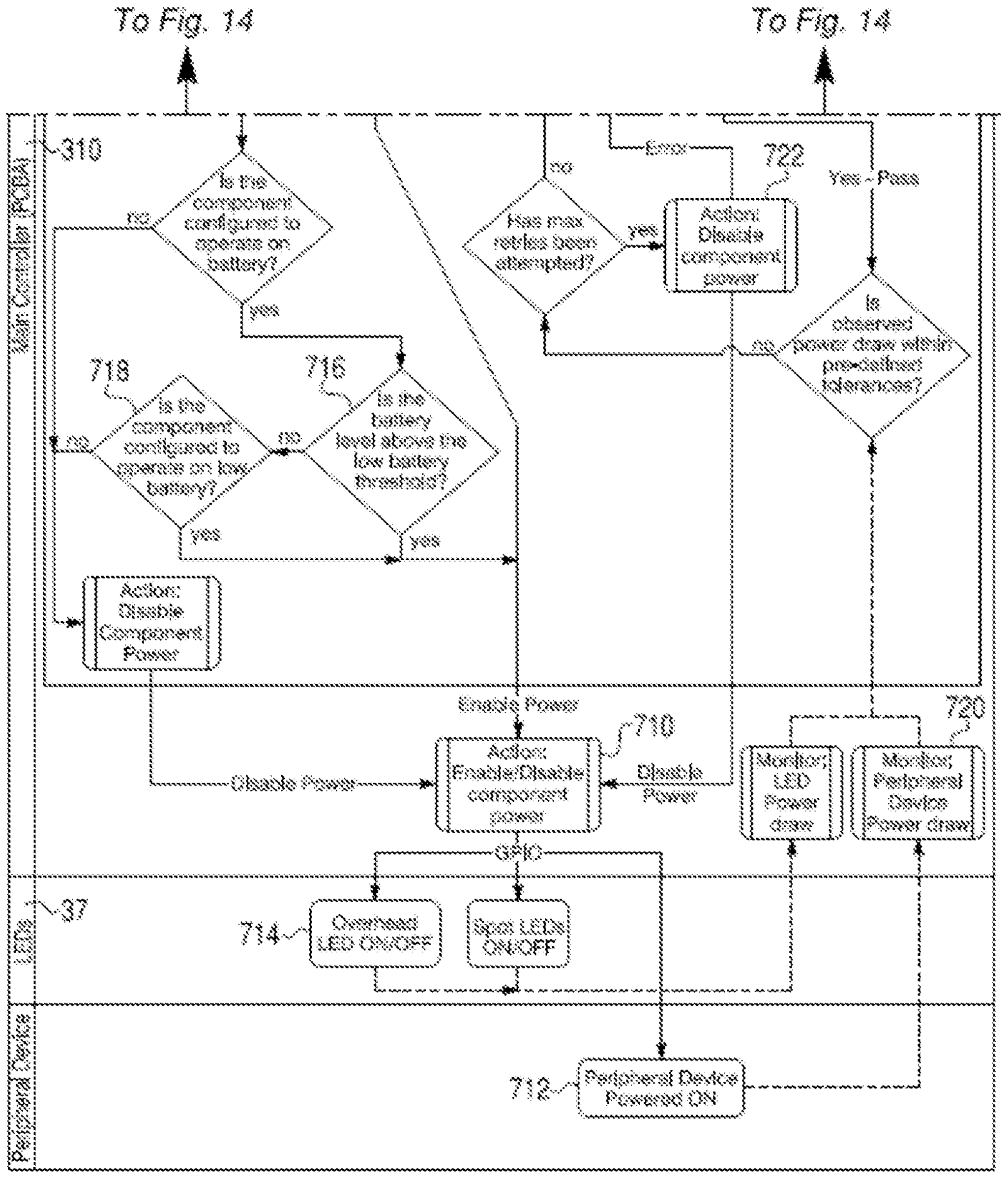
Figure 15:
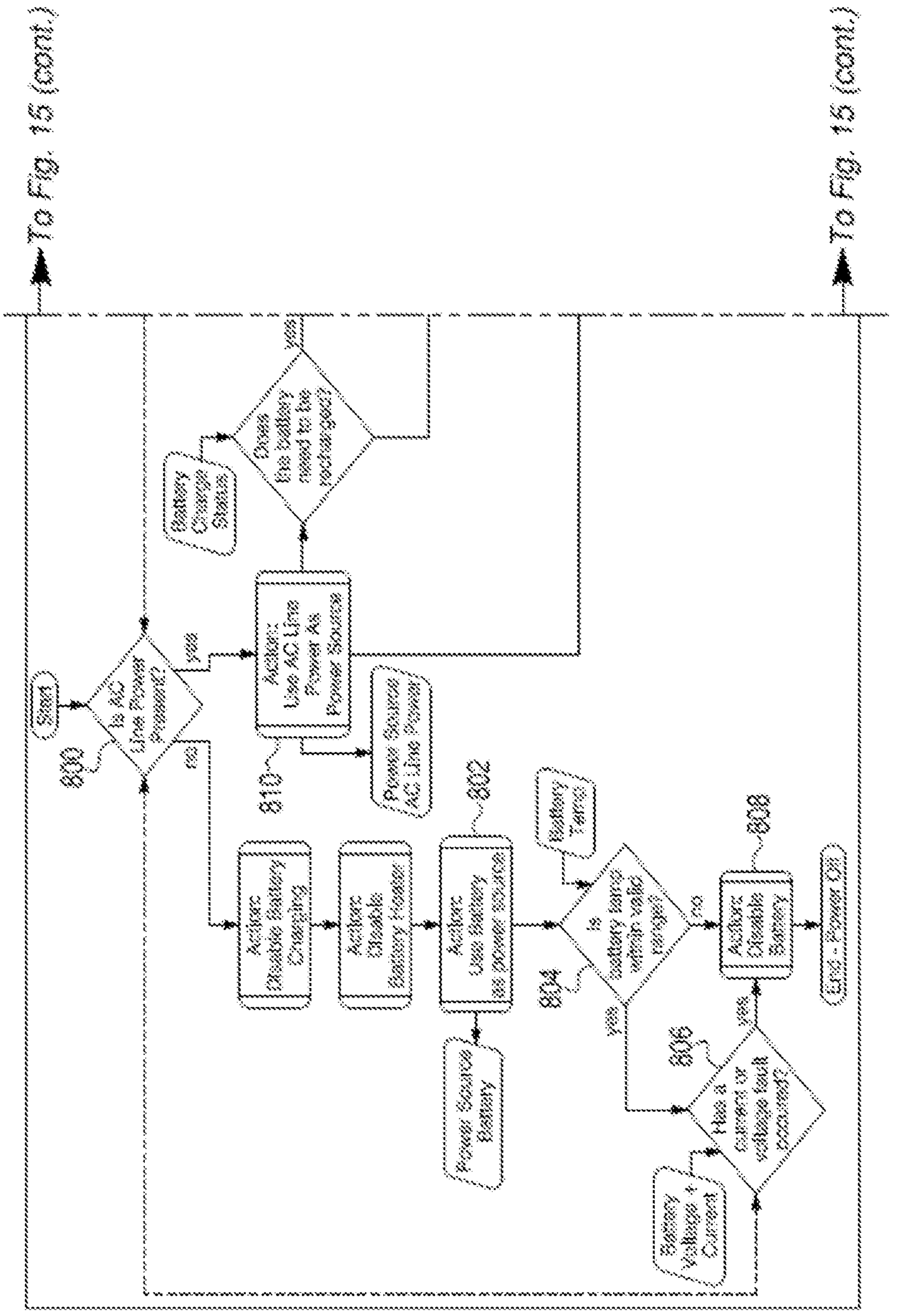
FIG. 15 is a flow diagram for a power source selection process for the door assembly.
Figure 15:
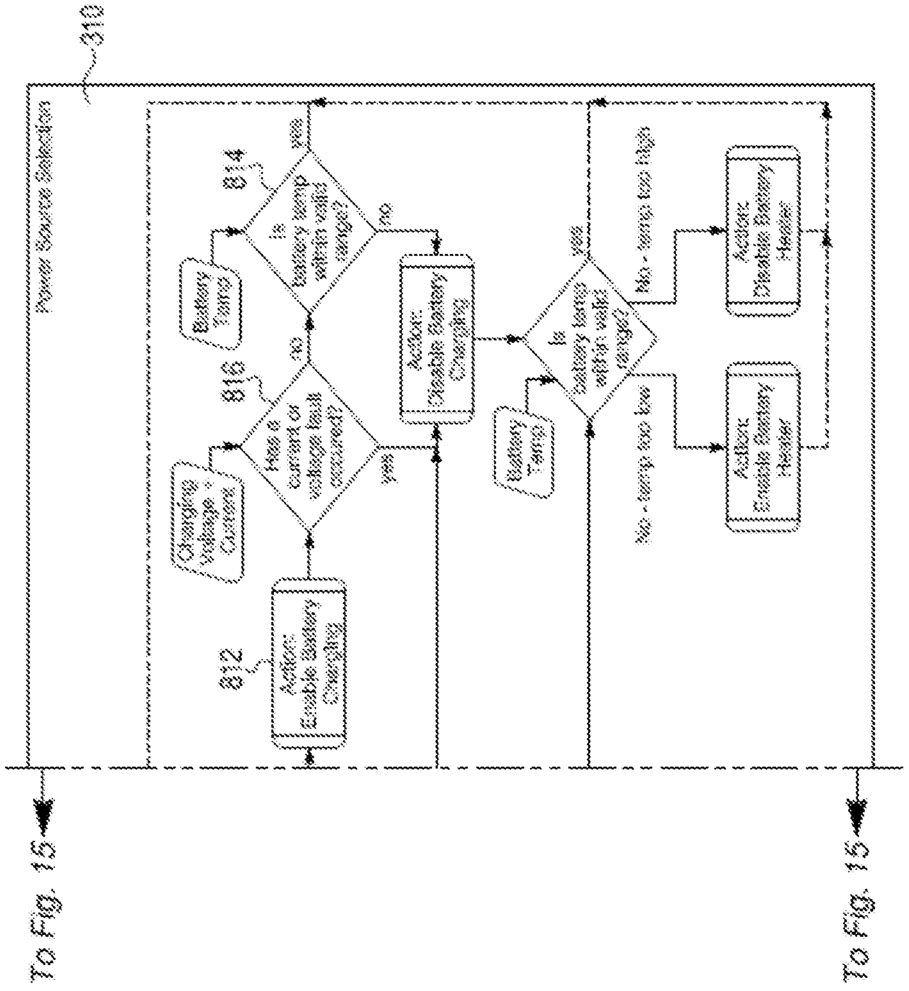

FIGS. 14 and 15 show an example of a power management function in accordance with the present invention. Each electric device has its own configuration. This configuration informs the application software on the control device 306 how that particular device should be controlled. Some critical components (i.e., door lock) are configured to run both on battery power and main or line power. Less critical components (i.e., LED lighting) are configured to only run when on main power, to prolong the amount of the time the door can operate while on battery power. The configuration for the electric devices may also include a list of triggers used to control the particular devices. In addition to manual input from a user, these triggers can also come from sensory input, such as a pushbutton located on the interior of the door in order to be accessible only to the user, and scheduling based on time and date. Exemplary triggers may come from a daylight sensor, a motion sensor, a door state sensor, a temperature sensor, etc. On the control device 306, the user may, through the user interface, modify a configuration for the electric devices (box 700), such as configuring the LEDs 37 for dusk to dawn mode which is determined from the daylight (optical) sensor. On the user's configuration change request, the main system 302 relays the command (boxes 704 or 706) (change request) to the controller 310 which initiates the power management function. Other functions may also be initiated, which include, but are not limited to, LED brightness and LED color. The electric device is then controlled based on this new configuration. When a triggering event occurs, the power management function determines whether the door is operating on main power and the electric device is then controlled based on the configuration. However, if the door is operating on battery power, the power management function checks to see if the electric device is configured to operate on battery power. If configured for battery power, the power management function then checks the battery level (box 714), and determines whether the battery level is sufficient to operate the electric device (box 716). If battery power is insufficient or the electric device is not configured to operate on battery power, then power to that electric device is disabled (box 710). On the other hand, if battery power is sufficient (i.e., battery capacity remaining which would not cause irreversible damage to the battery if more energy is discharged) and the electric device is operable on battery power, then the configuration entered by the user is enabled (box 710) and the electric device is activated (box 712 or 714). If there is sufficient battery for some but not all electric devices, the controller 310 prioritizes power to the electric devices as follows (from most to least importance): 1) controller 310; 2) electric door lock; 3) video doorbell; 4) sensors and spot LEDs; and 5) overhead LEDs. Thus, overhead LEDs would be the first to be disabled and the controller would be the last to be disabled. During operation of the electric devices, the controller 310 continues to monitor the power draw of the electric devices (box 720). The battery is used until main power becomes available or until battery power is depleted.

Power to a particular electric device is disabled (box 722) after several failed attempts to activate the electric device, if the power draw to the particular electric device exceeds a pre-defined tolerance for that device. The predefined tolerance can be either A) statically set in the software in controller 310; B) sent to the software in controller 310 during manufacturing; or C) from a configuration message set by the manufacturer and sent from the main system 302 to the software in the door (e.g., in the controller 310). Preferably, the tolerance may only be changed by the door manufacturere. The tolerance value is preferably determined by the door manufacturer by testing the electric device in every functional use case while in different temperature environments. Monitoring events, such as power draw (voltage and current), are recorded to a database (box 724) and reported to the user via a display on the control device 306 (box 726). This monitoring ensures the proper and safe operation of the door. It also helps protect against unauthorized devices being added to the door (see e.g., discussion for FIGS. 17A-17D below). In the context of power draw, each electric device creates a unique power draw profile when performing a particular task. If the observed power draw does not match the expected profile provided by the main system 302, the electric device may be deemed to either be not working correctly or not an authorized device. In either case, power to the the electric device is disabled.

During operation of the door, the controller 310 also continuously or periodically performs a power source selection process, as shown in FIG. 15. The process determines whether line power (AC) is available (box 800) by monitoring the voltage coming out of the power unit 42 and going to the controller 310. If line/main power is not present or not sufficient, the battery power source is activated (box 802). While battery power is activated, the battery temperature (box 804) and operating faults (box 806) are monitored via sensors (e.g., temperature, current, and voltage sensors on the battery), such that if the temperature exceeds the operating range or if a power fault occurs, the battery power is disabled (box 808). The sensors on the battery allow for monitoring of the temperature, voltage, and current going out of the battery. The operating ranges of temperature, voltage, and current for the battery are usually determined by the battery manufacturer and are embedded in the application software on the controller 310.

If on battery power due to line power not being available and line power is restored, the main system 302 returns the electric device(s) to line power, disables battery power, and notifies the user through control device 306. If line power is available, it is activated as the power source (box 810). While on line power, the battery is also charged (box 812), while the battery conditions, such temperature (box 814), voltage (box 816), and current (box 816), are continuously monitored to safely charge the battery. A battery heater is used to maintain the battery's temperature for safe operation while the door is running on battery power, and when the battery is being charged.

Figure 17A:
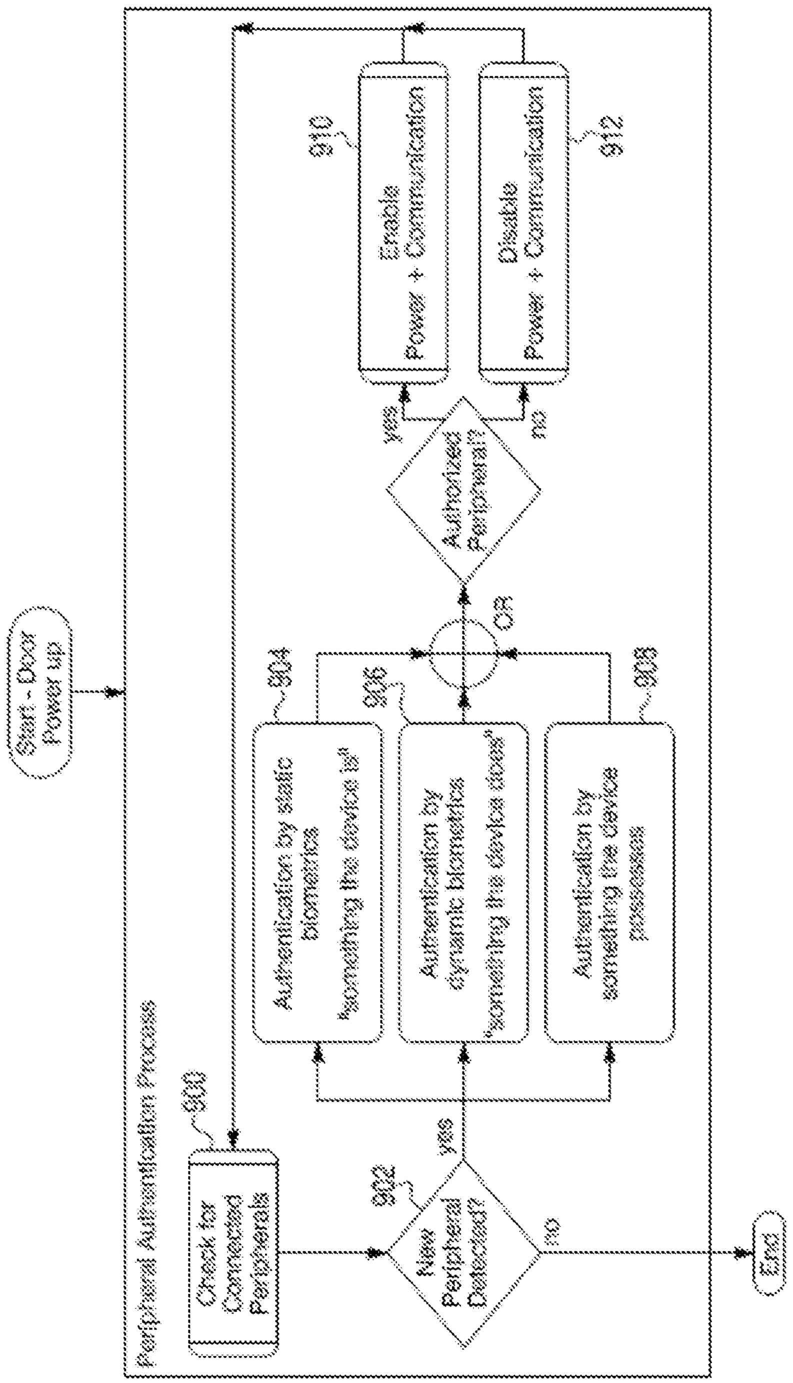
FIGS. 17A, 17B, 17C, and 17D are flow diagrams for a peripheral authentication process for the door assembly.

FIGS. 17A, 17B, 17C and 17D show the electric device authentication process in accordance with the present invention. For safe operation of the door, only authorized devices are permitted to operate. As shown in FIG. 17A, when the door begins operation, the controller 310 checks what electric devices are connected to the door 14 and/or door assembly 10 (box 900). The checks are accomplished by either A) monitoring power draw and seeing if any power draw is present; or B) including a loop back feature in a connector interface between the controller 310 and the electric devices 36, where the software provides voltage at a first pin, e.g., pin 1), and monitors whether that voltage is present at a second pin, e.g., pin 2 (the device is connected if a voltage is detected at pin 2). If the presence of main power is determined, the controller 310 then checks to see if any of the detected electric devices are new (box 902) (a new electric device is any device that has previously been disconnected but is detected as connected). If any new electric device is detected, the new electric device is authenticated according to the new electric device's static biometrics (box 904), dynamic biometrics (box 906), or some other unique identifiable feature the new electric device possesses or generates (box 908). If the new electric device is determined to be authorized for use with the door 14 and/or door assembly 10, then power is enabled for the new electric device (box 910) and communication between the new electric device and controller 310 is enabled (box 910). If it is determined that the new electric device is not authorized for use with the door 14 or door assembly 10, then power and communication with the new electric device are disabled.

Figure 17B:
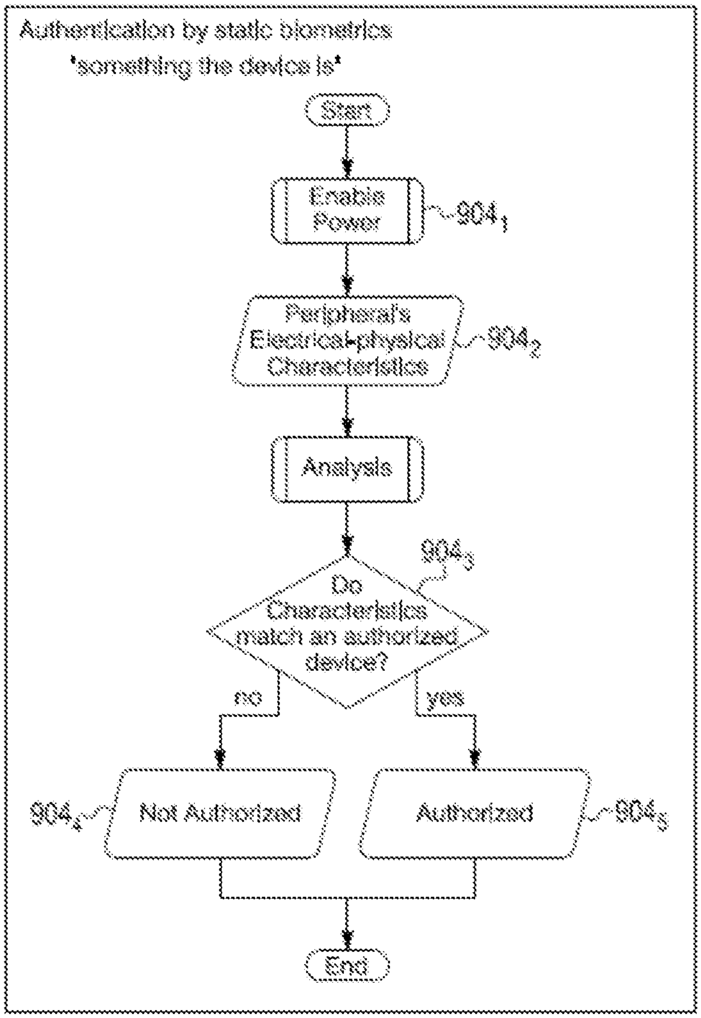

An exemplary static biometrics authentication process in accordance with the present invention is shown in FIG. 17B. During the static biometric authentication process, any new electric device detected by the controller 310 is authenticated based upon characteristics that are detectable on the electric device, e.g., the new electric device's electrical-physical characteristics. The charactersitics may be, but not limited to, current profile, voltage profile, inductance profile, capacitance profile, resistance profile, magnetic field profile, vibrations profile, and/or temperature profile. Any of these characteristics can be monitored over a defined period of time to obtain a profile. In this case, at power up, each type of device will behave a little differently when initially powered up, thus creating a unique signature profile for that device. The most practical characteristic to monitor is the current or voltage profile of the device. As further illustrated in FIG. 17B, after the static biometric authentication process begins, power is enabled for the new electric device (box 9041) and the new electric device's electrical-physical characteristics are determined (box 9042). The determined electrical-physical characteristics of the new electric device are then analyzed by the controller 310 to see if the electrical-physical characteristics match an authorized device type (box 9043). If there is a match, the new electric device is determined to be authorized (box 9045). If there is no match, the new electric device is determined to not be authorized (box 9044) and power supply to the new device is terminated. To analyze the electrical-physical characteristics, the software on controller 310 includes the pattern/signature of the electric device's electrical-physical characteristics, e.g., power profile, pre-programmed in the main controller 310. The main controller 310 enables power to the electric device and monitors the current and/or voltage of the particular electric device for a period of time. These measurements are then compared to the pre-programmed pattern/signature of the electric device's electrical-physical characteristics. The comparision can be done in several ways, but the preferred method is to use a look-up table of stored pre-programmed profiles (electrical-physical characteristics). For example, this look-up table may include a collection of voltage/current values taken at particular point in time. When a new electric device is powered on, the main controller 310 takes measurements at the same time intervals as the pre-programmed profiles. Then the measured values are compared with the corresponding values in the look-up table. If the measured values match the values in the lookup table, the device is electric determined to be authorized.

Figure 17C:
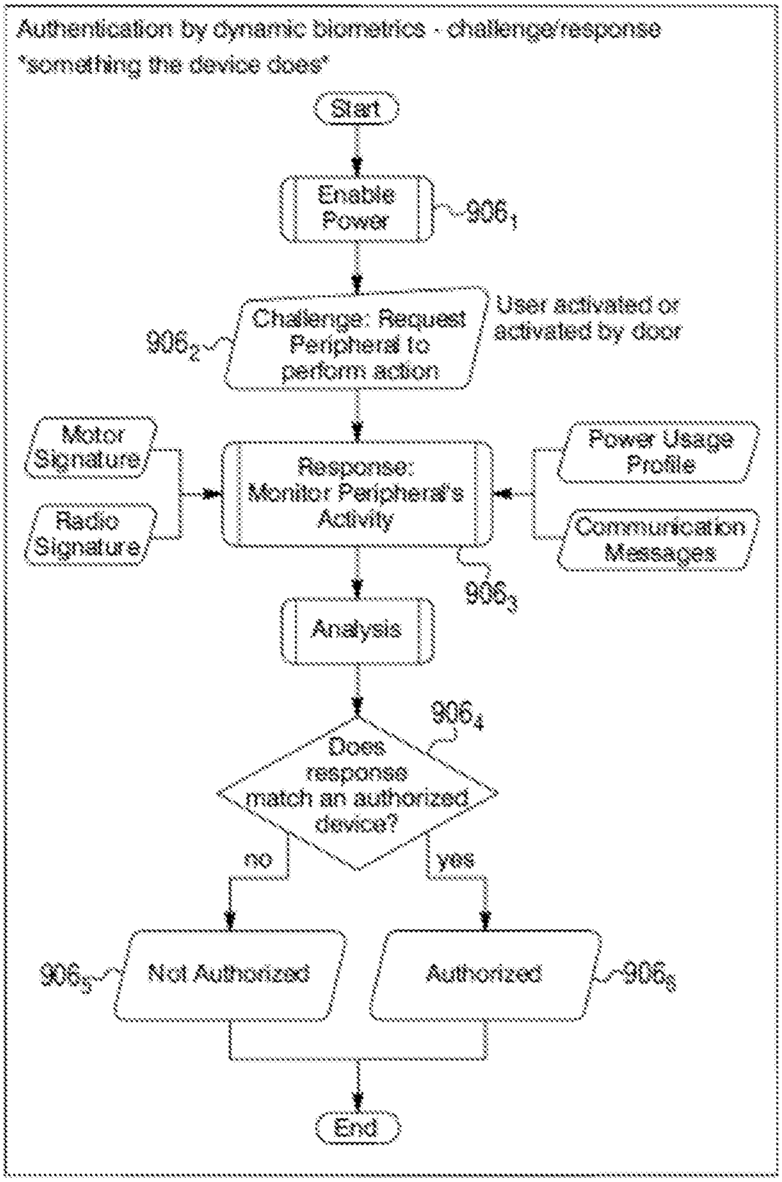

In FIG. 17C, a dynamic biometrics authentication process in accordance with the present invention is illustrated. During the dynamic biometric authentication process, any new electric device detected by the controller 310 is authenticated based upon some characteristic or functionality the device performs, e.g., the new electric device is challenged by main controller 310 to perform a certain action and is monitored to see if the new electric device's response matches that of an authorized device type. For example, a motor signature of the electric door lock may be monitored by commanding the lock to lock/unlock the door and look at the power profile, electormagnetic field, or vibrations, when performing those actions. The power profile is the preferred method. A radio signature may be monitored by commanding the device to connect to a WiFi network. The power profile of the device may be analyzed as described above. Furthermore, the timing and sequencing of how an electric device performs a particular task can be monitored and analyzed to determine whether the electric device is authorized or not. As best seen in FIG. 17C, once the dynamic biometric authentication process begins, power is enabled for the new electric device (box 9061). Subsequently, a challenge is issued to the new electric device, whereby the new electric device is asked to perform a specific action (box 9062). The challenge may be activated by the door 14 or door system 10 via the controller 310. Alternatively, a user may activate the challenge through the user interface of the application software on the control device 306 or by user interface physically located on the door 14 or electric device. After activation of the challenge, the response activity of the new electric device is monitored (box 9063) to see if the response activity matches an authorized electric device. The response activity that is monitored may include the new electric device's motor signature, radio signature, power usage profile, sequence and timing of different actions, or any communication messages created by the new electric device. The new electric device's response is then analyzed and compared with a response expected from authorized devices (box 9064) (as describe above). If the new electric device's response matches an authorized device, the new electric device is authorized for use with the door 14 and/or door assembly 10 (box 9066). But if no match is found, the new electric device is not authorized (box 9065) and power supply is terminated. Both static and dynamic biometrics may be used together to ensure that an electric device is authorized; however, only one is needed for authentication. Static biometric is usually less complex and easier to implement, but in certain cases, may be less secure than dynamic biometric.

Figure 17D:
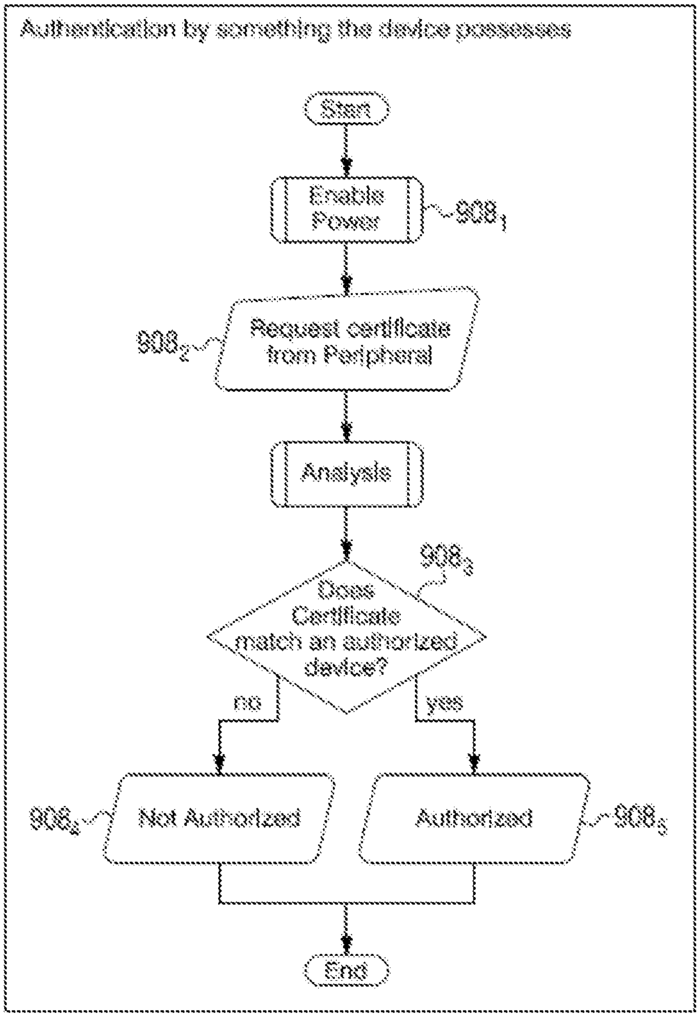

FIG. 17D further illustrates the authentication of a new electric device by a characteristic the new electric device possesses in accordance with the present invention. Upon starting the authentication process, power is enabled for the new electric device (box 9081). The controller 310 then requests a digital certificate (or other form of digital signature) from the new electric device (box 9082). In this case, the controller 310 may request the certificate locally over a wired connection (a communication bus) or via the local network. If a certificate is provided by the new electric device, the certificate is analyzed and compared with certificates expected from authorized devices (box 9083). If the new electric device's certificate matches with an authorized device's certificate, then the new electric device is authorized (box 9085). If there is no match, then the new electric device is not authorized for use with the door (box 9084) and power supply and communication is terminated.

Figure 18:
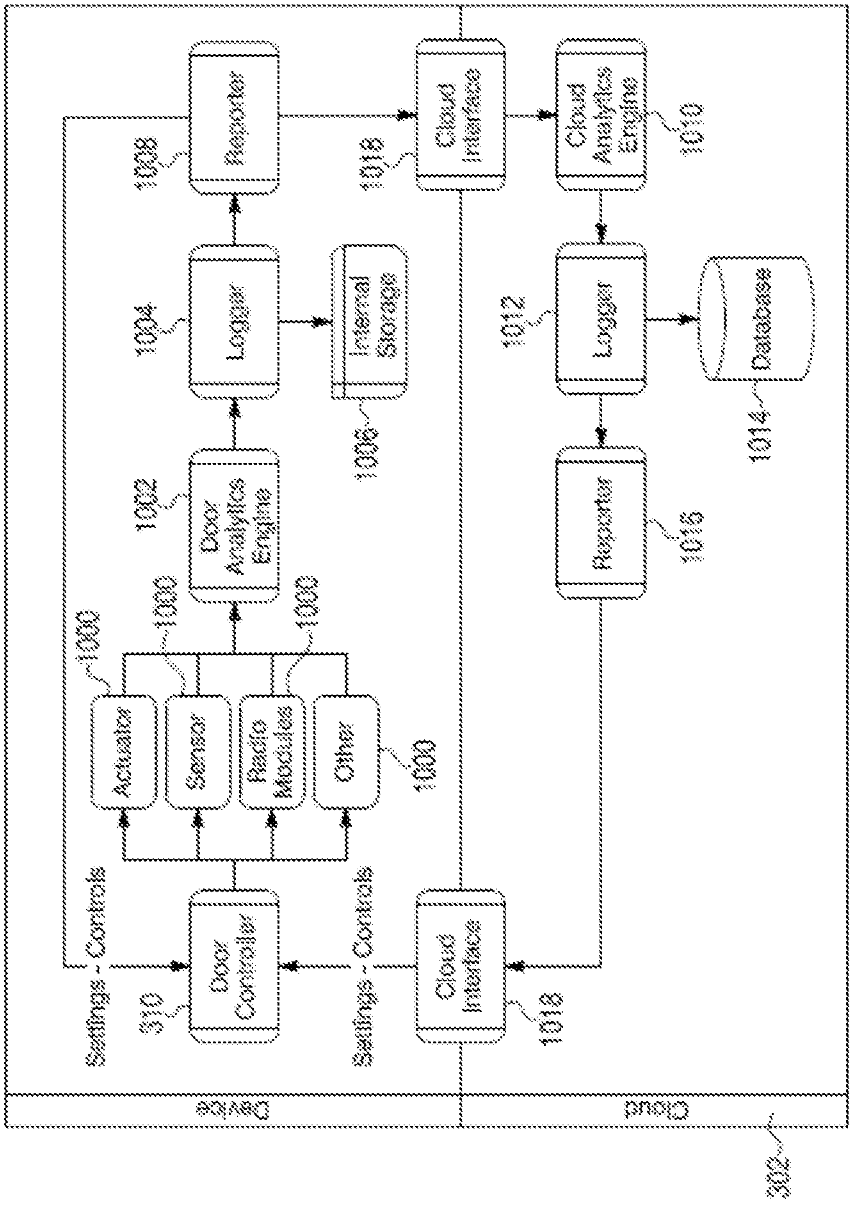
FIG. 18 is a flow diagram for a diagnostic data transmission process for the door assembly.

An example of the diagnostic data transmission process in accordance with the present invention is illustrated in FIG. 18. During operation of the door 14 and door assembly 10, the controller 310 requests data from submodules 1000 of the door assembly 10. The submodules 1000 are data sources used to monitor and control the functionality of the various electric devices integrated into the door assembly 10 and connected to the main system 302 or controller 310. The submodules 1000 may include actuators, sensors, radio modules, and other data sources located inside or on the door 14. The submodules 1000 may be built into the electric device(s) or may be a separate electric device(s), and capture events on the electric device in a log which can be analyzed to recognize patterns, e.g., of usage, movement, etc. For example, when motion is detected (motion sensor) at time A, followed shortly by power draw by the lock (voltage and current sensor), and followed shortly by door state change (door status sensor), the motion, voltage, current, and door status sensors are combined to determine that a user unlocked the door and entered shortly after time A. The data transmitted by the submodules 1000 is received by a door analytics engine 1002, preferably software on the controller 310, which defines the contents of a log record of the received data and how often the log record is generated. Once data has passed through the door analytics engine, the data is forwarded to a logger 1004, preferably a part of the controller 310. The logger 1004 buffers the input log records, appends a timestamp to the log records, and writes the log records to an internal storage 1006, preferably a part of the controller 310. For power and performance optimization, the logger 1004 stores data in an internal buffer until a minimum write threshold is reached, whereupon the logger 1004 writes the log records to the internal storage 1006. The minimum write threshold is determined based on a combination of 1) the number of reads/writes the storage can handle; 2) the time it takes to write data to the storage unit; and 3) the length of time the controller 310 is still functional after power is lost. Overall, the goal is to make sure the data is recorded at the internal storage 1006 before powering down so that the data is not lost. The logger 1004 forwards the data to a reporter 1008, preferably a part of the controller 310, where the reporter 1008 keeps track of the data last reported to the main system 302 and any new data that has been added since the last report to the main system 302. The reporter 1008 packages and sends the data to the controller 310 or main system 302 when an optimum reporting interval has been met or when the data is requested. The optimum reporting interval is determined based on the following factors: 1) the size of the data payload and the quality of the internet connection (poor connections would send less data at a time so it has a higher probability of getting through); 2) data costs of the cloud service provider; and 3) the amount of data to be sent. When the reporter 1008 sends data to the main system 302, the data passes through a cloud interface 1018 located in the door 14. The cloud interface 1018 manages the packaging of the data and the data's transmission to the portion of main system 302 that is expecting the data. Preferably, the data is compressed for easy, reliable, and inexpensive transmission. The compression preferably adheres to internet standard RFC 8949 (Concise Binary Object Representation (CBOR).

After management by the cloud interface 1018, the data is received by a cloud analytics engine 1010, preferably located on the main system 302. Similar to the door analytics engine 1002, the cloud analytics engine 1010 defines the contents of a log record of the received data and how often the log record is generated before sending the data to a cloud logger 1012, preferably located on the server of the cloud service provider. Once the data is received by the cloud logger 1012, the log records from the cloud analytics engine 1010 are buffered, a timestamp is appended, and the log records are written to a database 1014. The cloud logger 1012 then forwards the data to a cloud reporter 1016, preferably located on the server of the cloud service provider. The cloud reporter 1016 packages and sends the data to the controller 310 via the cloud interface 1018 when an optimum reporting interval has been met or when the data is requested. The data is typically requested for analysis as desired, e.g., the number of low battery events in the last month. The door reporter (1008) and the cloud reporter (1016) make new settings and controls to optimize performance of the door and the associated electric devices and to enable smart features, such as automatically increasing the motion sensor's sensitivity setting after noticing the door regularly has motion events that are not immediately following the door opening/closing (which hints at a lot of "false positives," i.e., turning on the lights when a user is not actually approaching the door). These settings and controls are sent to the door controller 310 which implements them when controlling the associated electric devices. The new settings and controls may also be determined manually by a person designated by the manufacturer of the door 14 looking at the data saved on the main system 302. The person may then manually trigger main system 302 to push the new settings and controls to the controller 310 on the door 14. Alternatively, the new settings and controls may be determined automatically by an algorithm. For example, the threshold setting for a dusk/dawn light on the door may be determined through an algorithm based on the location of the door and the sunrise/sunset times at that location.

When the door 14 is first installed, the installer downloads the installer application on his/her control device 306. The installer application is provided only to an installer who is authorized by the manufacturer of the door 14 and who has entered proper security credentials (e.g., login name and password). The installer application allows the installer, without needing to register the door or the electric device(s), to activate an automated function to determine whether the electric devices installed on the door are receiving power and operate properly. The operation may involve temporarily powering the devices on/off and/or scanning for an available WiFi network. At no time, however, is the installer allowed access to setting up security related electric devices, such as door lock, doorbell, and/or camera. Once proper installation of the electric devices is verified, the installer application provides a timestamp and diagnostic report to be save on the main system 302, which may be used to prove the door was properly installed and in working order at the time of installation. Because the installer cannot access the user application to activate and configure the electric devices on the door, security is enhanced as the electric devices are activated and authenticated only by the homeowner/user. The installer cannot create an electronic back door into the door assembly mand its electric devices.

Once properly installed, the control system 300 provides power and device management to the electric devices. Importantly, power is not permanently enabled to the electric devices until the user registers the door 14 with the manufacturer for security and ease of setup. This avoids the possibility that the installer (who is not the user) gaining access to the electric devices after installation. The installer may only use the installer application to temporarily power the electric devices to determine whether they are properly installed and operable. Once the door is registered by the homeowner/user, as discussed above, power is provided to the electric devices, which puts the devices 36 into setup mode to allow the user to setup and configure the devices. The user may then easily complete the setup procedure. However, for some devices the setup mode is exited after a period of time (e.g., 10 minutes) if the setup process is not completed (to save power). In that case, to get back into the setup mode, user must either press a button on the electric device or power cycle the electric device to put it back into setup mode. For security reasons this button is often located in a secure location (e.g., on the interior side of the lock, or requires a tool for access). For example, the setup button for a doorbell may embedded into a pocket in the door; and to access the button, the user may have to take off an end cap that exposes the pocket with the button in it.

The power and device management also provides extended battery life. When the door is running on battery backup, the electric devices are controlled in a smart manner to prolong battery life. For example, when operating on battery, LED lights are turned off and the LED indicator flashes (showing that the door 14 is powered) are slowed to conserve battery.

The smart power and device management further provides power safety. The application software on the controller 310 monitors the power draw of all electric devices and disables power to a particular electric device if an error is detected for the particular electric device. Additionally, if the application software detects that a particular electric device is drawing too much power, the controller 310 logs this as an "fault" and temporarily disables power to the "faulty" device. After waiting a period of time, e.g., 2-5 second, the controller 310 repowers the "faulty" device. If consecutive faults occur, the controller 310 logs this as an "error" and permanently disables power to the electric device until the door 14 is power cycled or the fault is fixed.

Once the door is properly installed and set up, the control system 300 provides advanced diagnostic data that allows for evaluation, e.g., by the manufacturer, of door usage trends, performance characteristics, and troubleshooting ability. The data is reported and saved to the main system 302 with all events timestamped. The data may be used to 1) detect when users are coming and going and automatically adjust the heating/ventilation/air conditioning (HVAC); 2) detect trends when users are typically home so packages have a higher probability of being delivered when a user is home; 3) send proactive maintenance reminders based on door/component usage; 4) provide security threats (e.g., by being able to see motion and failed unlock events); and 5) automatically run rules for other various automation tasks. The automation tasks may be 1) to change door operations to improve performance by updating and sending new configurations to the door 14 (e.g., changing dusk/dawn threshold based on the door's geographic region and time of year), or to trigger notification to the user in event of a detected error or fault; 2) to manage customer support (e.g., parsing content of the data to look for errors/trends); or 3) to improve user experience (e.g., sending the user a notification when the door 14 has been running on battery for a period of time, such as 2-5 hours). For each of the electric devices, one or more or all following diagnostic data is generated: power draw (current and voltage), on/off events, duration of activation events, and fault and error monitoring. For the main controller 310 and sensors, one or more or all following diagnostic data is generated: board temperature, power draw, fault and error monitoring, communication bus monitoring], and connectivity to the electric devices monitoring. For the battery, one or more or all following diagnostic data is generated: charge status, battery voltage, lowest batter voltage, battery power usage event, and fault and error monitoring.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof.

What is claimed is:

1. A door system comprising:

a. a door having an inner door frame which includes a pair of parallel spaced apart horizontally extending top and bottom rails and a pair of parallel, spaced apart first and second stiles;

b. one or more electric devices attached to the door;

c. a controller located in the door and electrically connected to the one or more electric devices; and d. a battery removably mounted in one of the stiles of the inner door frame and electrically connected to the controller for providing backup power, wherein the controller is configured to distribute power to the one or more electric devices and to communicate with the one or more electric devices, a control device, and a main system, and wherein the controller is configured to disable power to the one or more electric devices, if the power draw of at least one among the one or more electric devices exceeds a pre-defined tolerance for that device.

2. The door system of claim 1, wherein the controller communicates with the electric devices via a wired connection, and with the control device and the main system wirelessly.

3. The door system of claim 1, wherein the one or more electric devices include an electric power door latch, an electric power door lock, a doorbell, a digital camera, a light, a door open/closed sensor, or combinations thereof.

4. A method for controlling a door system, the method comprising the steps of:

a. providing the door system including i. a door having an inner door frame which includes a pair of parallel spaced apart horizontally extending top and bottom rails and a pair of parallel, spaced apart first and second stiles, ii. a first electric device attached to the door, iii. a second electric device attached to the door, iv. a control device, v. a main system configured to communicate with the control device, vi. a controller located in the door, and vii. a battery removably mounted in one of the stiles of the inner door frame and electrically connected to the controller for providing backup power, wherein the controller is configured to distribute power to the first and second electric devices, and to communicate with the first and second electric devices, the control device, and the main system;

b. activating the first and second electric devices by sending a command from the control device to the controller or by activating a trigger provided by a sensor;

c. distributing power from the control device to the first and second electric devices;

d. monitoring an operating condition of the first and second electric devices;

e. disabling the power to at least one among the first second electrical devices after failed attempts to activate the at least one electric device if the power draw of the device exceeds a pre-defined tolerance for that device; and f. providing continuous power to the first and second electrical devices via the control device if the operating condition is within a preset range provided by the main system.

5. The method of claim 4, wherein the operating condition is one of voltage and current.

6. The method of claim 4, further comprising the step of sending power to the controller from an AC/DC converter which receives AC power from a power supply.

7. The method of claim 4, wherein the battery electrically connected to the controller for providing backup power includes a sensor to detect fault conditions for safe operation.

8. The method of claim 4, further comprising the steps of:

a. monitoring the voltage, current draw, and/or temperature of the battery; and b. charging the battery by sending power from the controller to the battery, if the voltage, current draw, and/or temperature of the battery is within preset ranges provided by the main system.

9. The method of claim 8, further comprising the step of providing power to the controller from the battery when a power source is not available.

10. The method of claim 9, further comprising the steps of disconnecting the power from the battery to the controller when the power source becomes available or the battery power is too low to operate the first and second electric devices.

11. The method of claim 9, further comprising the step of prioritizing power distribution to the first and second electric devices based on available battery power.

12. The method of claim 11, wherein the step of prioritizing power distribution involves disconnecting power from the controller to one or both of the electric devices.

13. The method of claim 4, wherein the first electric device is an LED and the monitoring step is provided by a day light sensor, and the second electric device is a power door lock and the monitoring step is provided by voltage and current draw of the power door lock.

14. The method of claim 4, wherein the monitoring step includes forwarding and saving monitoring data to the main system.

* * * * *